US012186144B2

(12) United States Patent
Dingeldein et al.

(10) Patent No.: US 12,186,144 B2
(45) Date of Patent: Jan. 7, 2025

(54) DENTAL RESTORATION MOLDS

(71) Applicant: Solventum Intellectual Properties Company, Maplewood, MN (US)

(72) Inventors: Joseph C. Dingeldein, Hudson, WI (US); John M. Pilgrim, Woodbury, MN (US); Christopher R. Kokaisel, Woodbury, MN (US); Katelyn M. Languell, Eagan, MN (US); James D. Hansen, White Bear Lake, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 735 days.

(21) Appl. No.: 17/266,431

(22) PCT Filed: Aug. 7, 2019

(86) PCT No.: PCT/US2019/045483
§ 371 (c)(1),
(2) Date: Feb. 5, 2021

(87) PCT Pub. No.: WO2020/033532
PCT Pub. Date: Feb. 13, 2020

(65) Prior Publication Data
US 2021/0290349 A1    Sep. 23, 2021

Related U.S. Application Data

(60) Provisional application No. 62/756,631, filed on Nov. 7, 2018, provisional application No. 62/756,675, filed
(Continued)

(51) Int. Cl.
*A61C 13/107*    (2006.01)
*A61C 5/20*      (2017.01)
(Continued)

(52) U.S. Cl.
CPC ............ *A61C 13/0001* (2013.01); *A61C 5/20* (2017.02); *A61C 13/0004* (2013.01); *A61C 13/20* (2013.01)

(58) Field of Classification Search
CPC . A61C 13/20; A61C 13/0001; A61C 13/0004; A61C 5/20
See application file for complete search history.

(56) References Cited

U.S. PATENT DOCUMENTS

| 613,947 A | 11/1898 | Strout |
| 1,367,628 A | 2/1921 | Roach |

(Continued)

FOREIGN PATENT DOCUMENTS

| CN | 204709027 | 10/2015 |
| DE | 10 2009 039 880 | 3/2011 |

(Continued)

OTHER PUBLICATIONS

"Bite-perf: the art of occlusal duplication", [retrieved form the internet on Aug. 8, 2017], URL <www.biteperf.es>, 2pgs.
(Continued)

*Primary Examiner* — Cris L. Rodriguez
*Assistant Examiner* — Sydney J Pulvidente

(57) ABSTRACT

A custom tool for forming a dental restoration in a mouth of a patient. The custom tool includes a facial mold body for a patient-specific, customized fit with the facial side of at least one tooth of the patient, wherein the facial mold body includes a restorative portion, at least one aperture aligned with a portion of a surface of a tooth to be restored and at least one door having an inner surface forming a portion of the mold cavity encompassing missing tooth structure of the tooth to be restored, wherein the door mates with the aperture; a lingual mold body for a patient-specific, customized fit with the lingual side of the tooth of the patient,
(Continued)

wherein the lingual mold body includes a restorative portion; wherein the facial mold body and lingual mold body are configured to interlock together; and wherein the facial mold body and lingual mold body are configured to combine with the tooth of the patient to form a mold cavity encompassing missing tooth structure of at least one tooth to be restored.

17 Claims, 11 Drawing Sheets

Related U.S. Application Data on Nov. 7, 2018, provisional application No. 62/717,506, filed on Aug. 10, 2018, provisional application No. 62/717,485, filed on Aug. 10, 2018.

(51) Int. Cl.
   *A61C 13/00* (2006.01)
   *A61C 13/20* (2006.01)

(56) References Cited

U.S. PATENT DOCUMENTS

| | | | |
|---|---|---|---|
| 2,090,904 A | 7/1933 | Singer |
| 2,674,801 A | 4/1954 | Trangmar |
| 2,744,326 A | 5/1956 | Morris et al. |
| 3,224,050 A | 12/1965 | Redtenbacher |
| 3,482,314 A | 12/1969 | Tofflemire |
| 4,368,040 A | 1/1983 | Weissman |
| 4,433,959 A | 2/1984 | Faunce |
| 4,695,254 A | 9/1987 | Herrell |
| 4,704,087 A | 11/1987 | Dragan |
| 4,713,005 A | 12/1987 | Marshall |
| 4,775,320 A | 10/1988 | Marshall |
| 4,775,430 A | 10/1988 | Tanaka |
| 4,778,386 A | 10/1988 | Spiry |
| 4,881,898 A | 11/1989 | Harvey, Sr. |
| 5,114,341 A | 5/1992 | Kassel |
| 5,192,207 A | 3/1993 | Rosellini |
| 5,195,889 A | 3/1993 | Von Weissenfluh |
| 5,213,498 A | 5/1993 | Pelerin |
| 5,332,390 A | 7/1994 | Rosellini |
| 5,382,160 A | 1/1995 | Shemet |
| 5,487,663 A | 1/1996 | Wilson |
| 5,803,734 A | 9/1998 | Knutson |
| 5,890,896 A | 4/1999 | Padial |
| 6,482,314 B1 | 11/2002 | Khare |
| 6,659,772 B2 | 12/2003 | Margeas |
| 6,776,614 B2 | 8/2004 | Weichmann |
| 6,821,462 B2 | 11/2004 | Schulman |
| 6,845,175 B2 | 1/2005 | Kopelman |
| 7,027,642 B2 | 4/2006 | Rubbert |
| 7,056,115 B2 | 6/2006 | Phan |
| 7,092,780 B2 | 8/2006 | Ganley |
| 7,162,321 B2 | 1/2007 | Luthardt |
| 7,217,131 B2 | 5/2007 | Vuillemot |
| 7,234,937 B2 | 6/2007 | Sachdeva |
| 7,236,842 B2 | 6/2007 | Kopelman |
| 7,442,040 B2 | 10/2008 | Kuo |
| 7,605,817 B2 | 10/2009 | Zhang |
| 7,689,310 B2 | 3/2010 | Kopelman |
| 7,731,495 B2 | 6/2010 | Eisenberg |
| 7,801,632 B2 | 9/2010 | Orth |
| 7,956,862 B2 | 6/2011 | Zhang |
| 8,194,067 B2 | 6/2012 | Raby |
| 8,255,071 B2 | 8/2012 | Kaigler, Sr. |
| 8,308,478 B2 | 11/2012 | Primus |
| 8,359,114 B2 | 1/2013 | Steingart |
| 8,366,445 B2 | 2/2013 | Vuillemot |
| 8,393,897 B2 | 3/2013 | Clark |
| 8,491,306 B2 | 7/2013 | Raby |
| 8,527,079 B2 | 9/2013 | Kim |
| 8,696,356 B2 | 4/2014 | Hegyi |
| 8,753,114 B2 | 6/2014 | Vuillemot |
| 8,794,965 B2 | 8/2014 | Latiolais |
| 8,882,497 B2 | 11/2014 | Frantz |
| 8,909,363 B2 | 12/2014 | Kopelman |
| 9,308,058 B2 | 4/2016 | Clark |
| 9,375,290 B2 | 6/2016 | Csapo |
| 9,414,895 B2 | 8/2016 | Clark |
| 10,327,873 B2 | 6/2019 | Fisker |
| 10,743,968 B2 | 8/2020 | Fisker |
| 2003/0170593 A1 | 9/2003 | Dorfman |
| 2004/0029068 A1 | 2/2004 | Sachdeva |
| 2005/0042577 A1 | 2/2005 | Kvitrud |
| 2005/0089813 A1 | 4/2005 | Slone |
| 2005/0089814 A1 | 4/2005 | Slone |
| 2006/0008777 A1 | 1/2006 | Peterson |
| 2006/0115792 A1 | 6/2006 | Vuillemot |
| 2006/0122719 A1 | 6/2006 | Kopelman |
| 2008/0153069 A1 | 6/2008 | Holzner |
| 2008/0227056 A1 | 9/2008 | Bulard |
| 2009/0026643 A1 | 1/2009 | Wiest |
| 2009/0104581 A1 | 4/2009 | Simon |
| 2010/0159412 A1 | 6/2010 | Moss |
| 2011/0212420 A1 | 9/2011 | Vuillemot |
| 2012/0029018 A1 | 2/2012 | Lee |
| 2013/0130202 A1 | 5/2013 | Vuillemot |
| 2013/0325431 A1 | 12/2013 | See |
| 2014/0205967 A1 | 6/2014 | Csapo |
| 2015/0057782 A1 | 2/2015 | Kopelman |
| 2015/0140517 A1 | 5/2015 | Vuillemot |
| 2015/0182301 A1 | 7/2015 | Hegland |
| 2015/0250568 A1 | 9/2015 | Fisker |
| 2016/0015246 A1 | 1/2016 | Clausen |
| 2016/0089220 A1 | 3/2016 | Ebert |
| 2016/0143717 A1 | 5/2016 | Samrano |
| 2016/0262860 A1 | 9/2016 | Korten |
| 2017/0119499 A1 | 5/2017 | Clark |
| 2017/0273763 A1 | 9/2017 | Fisker |
| 2018/0021113 A1 | 1/2018 | Hansen |
| 2018/0280116 A1 | 10/2018 | Hansen |
| 2018/0360577 A1 | 12/2018 | Hansen |
| 2019/0083208 A1 | 3/2019 | Hansen |
| 2019/0201165 A1 | 7/2019 | Mishaeloff |
| 2019/0298489 A1 | 10/2019 | Dingeldein |
| 2021/0282906 A1* | 9/2021 | Popp .................... A61C 9/0006 |
| 2021/0290349 A1* | 9/2021 | Dingeldein ........ A61C 13/0004 |
| 2021/0378789 A1 | 12/2021 | Dingeldein et al. |
| 2023/0157796 A1 | 5/2023 | Kohnen |

FOREIGN PATENT DOCUMENTS

| | | |
|---|---|---|
| DE | 10 2012 108 217 | 12/2013 |
| EP | 2 400 914 | 8/2018 |
| FR | 2500294 | 8/1982 |
| JP | 2008-119225 | 5/2008 |
| JP | 2014-171698 | 9/2014 |
| JP | 2018501857 A | 6/2017 |
| WO | WO 2007-084727 | 7/2007 |
| WO | WO 2009/010543 | 1/2009 |
| WO | WO 2009-042378 | 4/2009 |
| WO | WO 2009-158231 | 12/2009 |
| WO | WO 2011-041193 | 4/2011 |
| WO | WO 2011/156806 | 12/2011 |
| WO | WO 2016/046308 | 3/2016 |
| WO | WO 2016/066552 | 5/2016 |
| WO | WO 2016/094272 | 6/2016 |
| WO | WO 2016/095272 | 6/2016 |
| WO | 2017106431 A1 | 6/2017 |
| WO | WO 2017-106419 | 6/2017 |
| WO | WO 2017-106431 | 6/2017 |
| WO | WO 2018/022616 | 2/2018 |
| WO | WO 2018/022617 | 2/2018 |
| WO | WO-2018022617 A1 * | 2/2018 ......... A61C 13/0001 |
| WO | WO 2020/033528 | 2/2020 |
| WO | WO 2020/033532 | 2/2020 |

(56) References Cited

FOREIGN PATENT DOCUMENTS

WO     WO 2020058855     3/2020
WO     2021245489 A1     12/2021

OTHER PUBLICATIONS

"Bite-perf: Training kit (English)", youtube, [retrieved form the internet on Aug. 8, 2017], URL <http://www.youtube.com/watch?v=tCw45t_ntrA>, 1pg.
3M Oral Care lecture, 2015, 16pgs.
"Cavity," Merriam-Webster.com Dictionary, Merriam-Webster, https://www.merriam-webster.com/dictionary/cavity. Accessed Jan. 4, 2021, 14 pages. (2021).
Conte, "A Clear PVS Matrix Technique for the Placement of Posterior Direct Composites", Dentistry Today, Apr. 30, 2008, 5pgs.
"Incisal," Merriam-Webster.com Dictionary, Merriam-Webster, https://www.meriam-webster.com/dictionary/cavity. Accessed Oct. 14, 2021, 3 pages. (2021).
"Smooth," Merriam-Webster.com Dictionary, Merriam-Webster, https://www.merriam-webster.com/dictionary/cavity. Accessed Oct. 13, 2021, 7 pages. (2021).
International Search Report for PCT International Application No. PCT/US2019/045483, dated Oct. 29, 2019, 5 pages.

\* cited by examiner

DENTAL RESTORATION MOLDS

BACKGROUND

A dental restoration, or a dental filling, utilizes a restorative dental material used to improve function, integrity and morphology of missing or irregular tooth structure. For example, a dental restoration may be used to restore missing tooth structure due to congenital discrepancies, following external trauma, as part of a restorative treatment for dental caries or tooth decay, or for aesthetic reasons.

Restorative dentistry often includes drilling decay from an infected tooth (commonly referred to as "preparing" the tooth) and then using simple tools and a high level of craftsmanship to isolate, retract, fill and contour the finished restoration. Quality isolation via a rubber dam is cumbersome and often skipped for less effective isolation via cotton rolls-increasing the risk of contamination which reduces longevity of the restoration. Retraction of soft and hard tissue includes manipulation of cords, wedges and matrix bands, and imperfect technique may result in contamination, difficulty in finishing and/or polishing in interproximal areas, and poorly adapted contacts.

While 'bulk fill' restorative materials and high intensity curing lights facilitate relatively fast filling of deep cavities (e.g., 4-5 mm), many restorations are completed in a single shade as practitioners may be uncertain of the correct layering protocol for multiple shades or types of restorative material. Last, with little geometrical guidance available on a prepared tooth, creation of the final filling level and occlusal surface geometry may include overfilling with restorative dental material, followed by an iterative process of grinding and checking tooth contact and biting function on an anesthetized patient. This process may be the most time consuming for dental restorations and errors here may result in tooth sensitivity and return visits for adjustment.

Commonly-assigned patent applications United States Patent Publ. No. 2018/0021113, titled "Dental Restoration Molding Techniques," filed Dec. 7, 2015, U.S. patent application Ser. No. 16/061,362, titled "One-Piece Dental Restoration Molds," filed Dec. 15, 2016, U.S. patent application Ser. No. 16/061,350, titled "Dental Restoration Molds," filed Dec. 15, 2016, WO 2018/022616 Publ. No., titled "Dental Restoration Molds," filed Jul. 25, 2017, and U.S. Patent Provisional Application Ser. No. 62/560,457, titled "Dental Restoration Molds," filed Sep. 19, 2017 all disclose dental restoration techniques incorporating the molding of dental restorative material directly on a tooth located within the mouth of a patient.

SUMMARY

This disclosure relates to methods for dental restoration, custom tools used for dental restoration and techniques for producing custom tools for dental restoration In one example, the disclosure is directed to a custom tool for forming a dental restoration in a mouth of a patient. The custom tool includes a facial mold body for a patient-specific, customized fit with the facial side of at least one tooth of the patient, wherein the facial mold body includes a restorative portion, at least one aperture aligned with a portion of a surface of a tooth to be restored and at least one door having an inner surface forming a portion of the mold cavity encompassing missing tooth structure of the tooth to be restored, wherein the door mates with the aperture; a lingual mold body for a patient-specific, customized fit with the lingual side of the tooth of the patient, wherein the lingual mold body includes a restorative portion; wherein the facial mold body and lingual mold body are configured to interlock together; and wherein the facial mold body and lingual mold body are configured to combine with the tooth of the patient to form a mold cavity encompassing missing tooth structure of at least one tooth to be restored.

In further examples, this disclosure is directed to methods of forming a dental restoration, and methods of designing a custom tool for forming a dental restoration of a tooth.

The custom tools and methods described herein may be used in combination with any of the previously described examples to create full, partial, or sequential restorations in the mouth of a patient.

DETAILED DESCRIPTION

Figure 1:
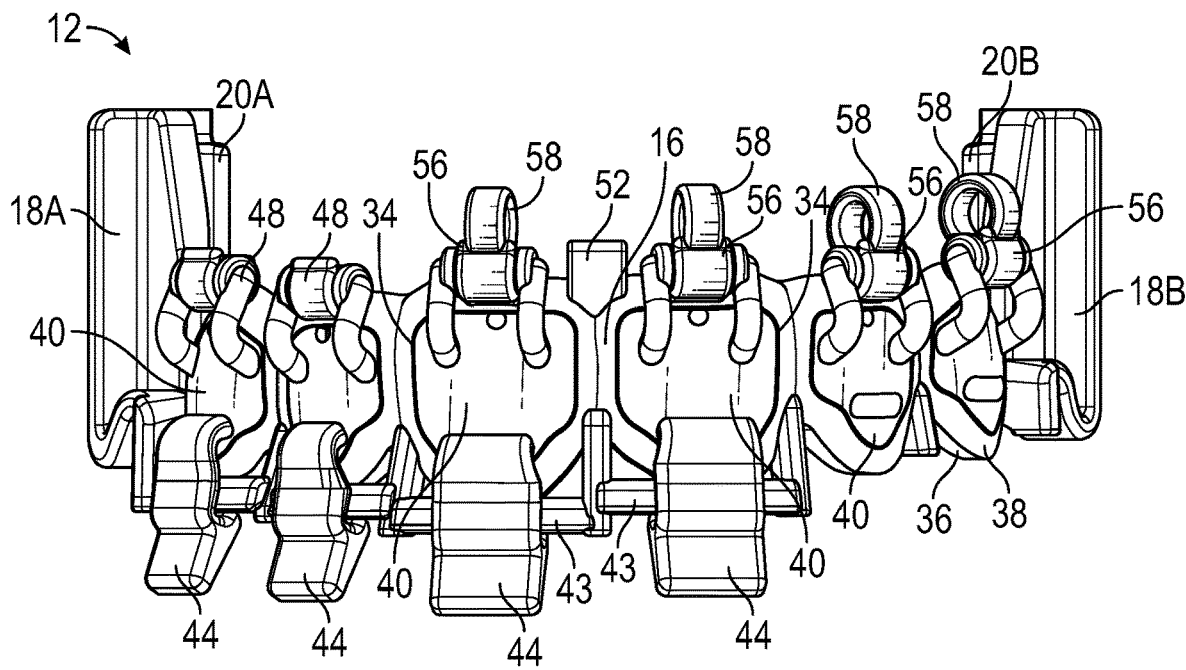
FIG. 1 is a front view of an embodiment of a facial mold body that may be a part of a custom tool for forming a dental restoration.

Restorative dentistry may be used to add tooth structure to a patient's dentition, e.g., to an existing tooth, in order to improve at least one of function, integrity, aesthetics, or morphology of missing or irregular tooth structure. For example, restorative dentistry can be an aesthetic treatment to improve appearance of teeth by, for example, altering their shape and/or optical properties (e.g., shade, translucency), which can be achieved using any suitable technique, such as by applying a veneer, managing position or contour of adjacent soft tissues, lessening or removing a gap (diastema) and/or resolving the appearance of malposition. As another example, restorative dentistry may be used to adjust the biting or chewing function of teeth to affect tooth function and/or other aspects of overall oral health such as temporomandibular joint (TMJ) disorders, excessive wear, periodontal involvement, gingival recession or as part of a larger plan to construct a healthy and stable oral environment.

In some cases, a dental restoration process includes drilling decay from an infected tooth or reshaping teeth by removing undesired tooth structure (e.g., which may be referred to as "preparing" the tooth) and then using tools and craftsmanship to manually isolate, retract, fill and contour the finished restoration.

Different techniques may be used to isolate the dental restoration site. Quality isolation of the dental restoration site via a rubber dam can be cumbersome and may be skipped for less effective isolation via cotton rolls, which may increase the risk of contamination, reduce longevity of the restoration, or both. Retraction of soft and hard tissue may include manipulation of cords, wedges and matrix bands. Imperfect retraction techniques may result in contamination, difficulty in achieving proper tooth contours and symmetry, finishing and/or polishing in interproximal areas, poorly adapted contacts, or any combination thereof.

While "bulk fill" restorative materials and high intensity curing lights may facilitate relatively fast filling of deep cavities (e.g., 4-5 mm), many restorations may be completed in a single shade as practitioners may be uncertain of the correct layering protocol for multiple shades or types of restorative material. Additionally, with little geometrical guidance available on a prepared tooth, creation of the final filling level and occlusal surface geometry may include overfilling with restorative dental material, followed by an iterative process of grinding and checking tooth contact and biting function on an anesthetized patient. This process may be the most time consuming for dental restorations and errors here may result in tooth sensitivity and return visits for adjustment.

The tools described herein may include features designed to provide interferences between the two primary mold portions of the tool and certain engagement portions which interlock, which overall helps with preventing relative movement between the mold portions in multiple directions, helps with better clamping of the tool to the patient's teeth and for sealing the two mold portions together. Such interferences are digitally designed into the custom mold is when it is designed and produced. Traditional molds do not have digitally designed interferences. In order to interlock together or separate the two mold portions from each other, they may need to deform or bend. In addition, the tools described herein may eliminate the need for external tools, like ring clamps, and are instead self-contained and thus, quicker and simpler to install on a patient's teeth. In addition, captive doors provide a reduction of individual parts that need to be assembled, and decreasing the likelihood of losing individual parts. Lastly, the tools described herein may reduce flash and/or to allow increased control of the placement of restorative material compared to practitioners using more traditional skills, tools and techniques.

In some examples, a tool described herein may be digitally designed. For example, a tool may be designed using a three-dimensional (3D) model of the patient's tooth structure (e.g., obtained from an intraoral scan of all or part of the patient's dentition or scanning of a conventional impression or model). The tool can be, for example, manufactured from the digital data using an additive technique, such as 3D printing, or a subtractive technique, such as CAD/CAM milling.

In some examples, the tool for a dental restoration may include a mold designed based on the 3D model of the patient's tooth structure, and may include additional features to provide advantages over molds that are formed based simply on the 3D scan, a wax up model, or other molds based simply on the shape of the anatomy and/or desired tooth structure of the patient. The disclosed techniques may facilitate high quality dental restorations with improved quality, reduced flash, reduced time and/or skill requirements compared to conventional dental restoration techniques.

Example tools for a dental restoration are described in commonly-assigned patent applications United States Patent Publ. No. 2018/0021113, titled "Dental Restoration Molding Techniques," filed Dec. 7, 2015, U.S. patent application Ser. No. 16/061,362, titled "One-Piece Dental Restoration Molds," filed Dec. 15, 2016, U.S. patent application Ser. No. 16/061,350, titled "Dental Restoration Molds," filed Dec. 15, 2016, WO 2018/022616 Publ. No., titled "Dental Restoration Molds," filed Jul. 25, 2017, and U.S. Patent Provisional Application Ser. No. 62/560,457, titled "Dental Restoration Molds," filed Sep. 19, 2017, the entire contents of which are incorporated by reference.

Figure 2:
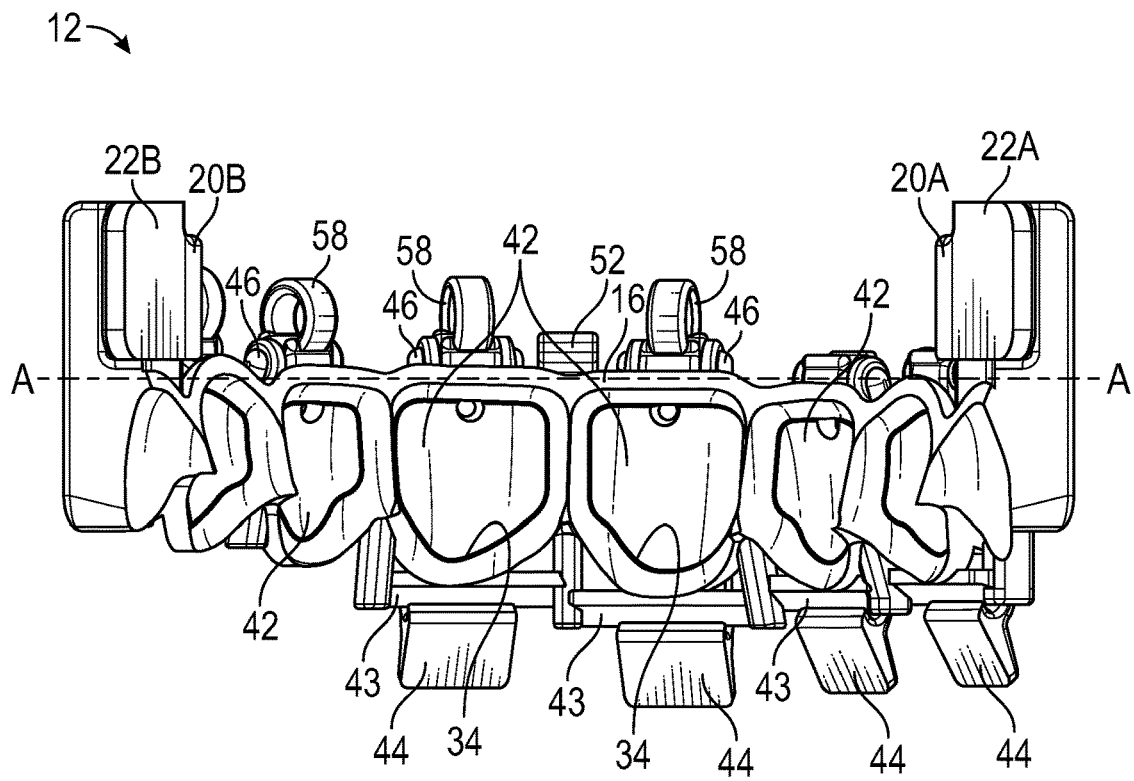
FIG. 2 is a back view of the facial mold body of FIG. 1.
Figure 3:
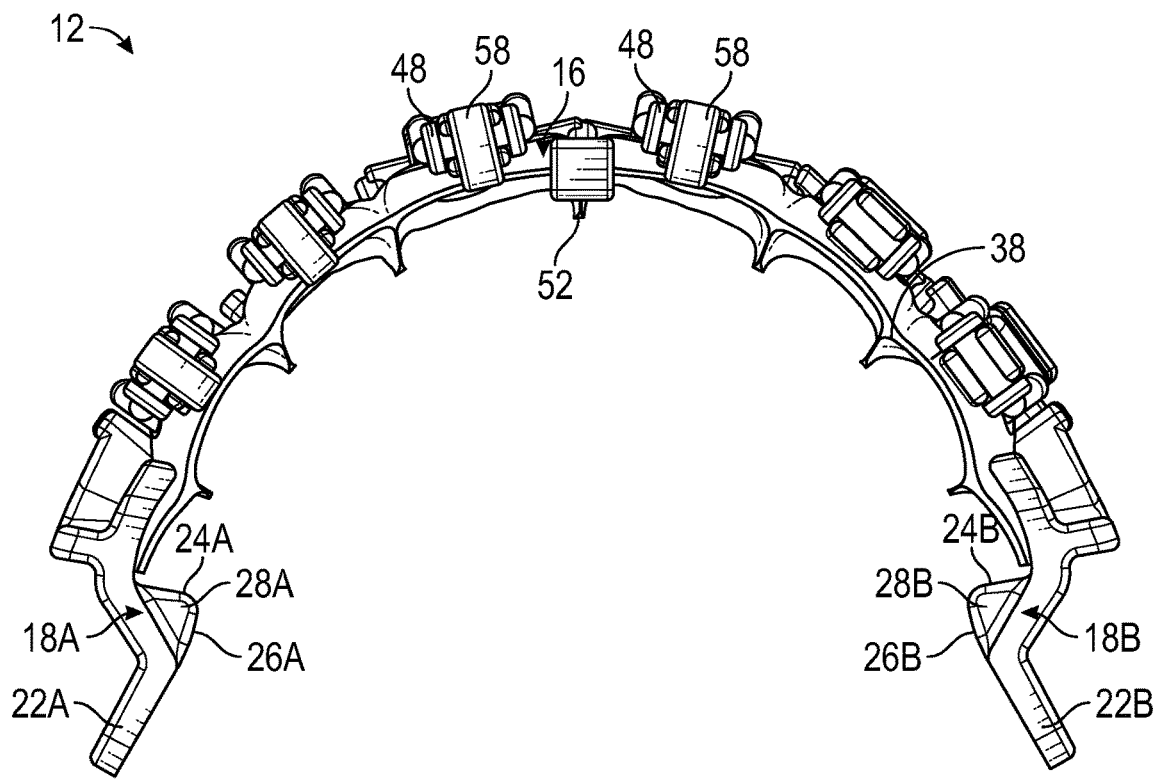
FIG. 3 is bottom view of the facial mold body of FIG. 1.
Figure 4:
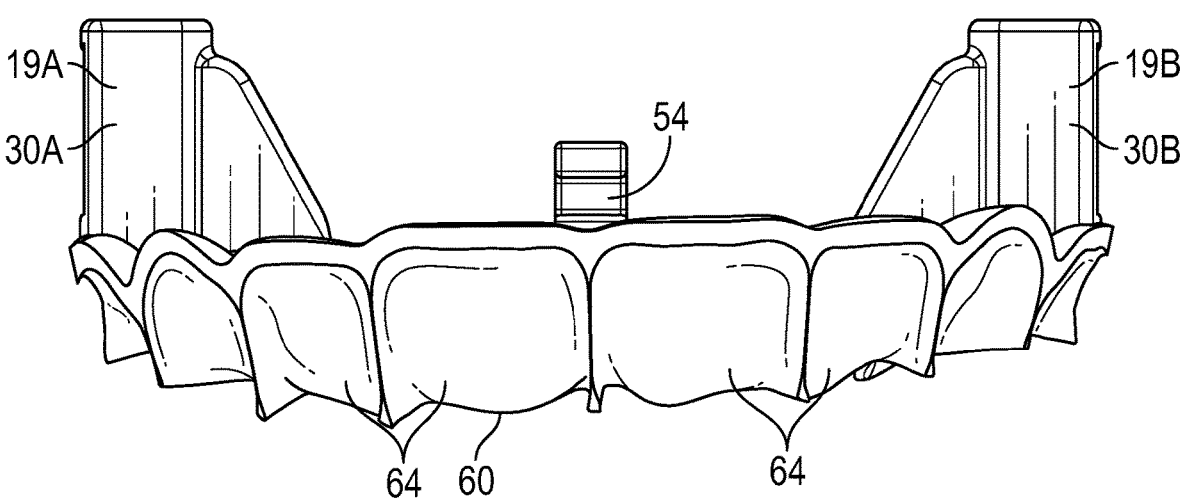
FIG. 4 is a front view of an embodiment of a lingual mold body that may be a part of a custom tool for forming a dental restoration.
Figure 5:
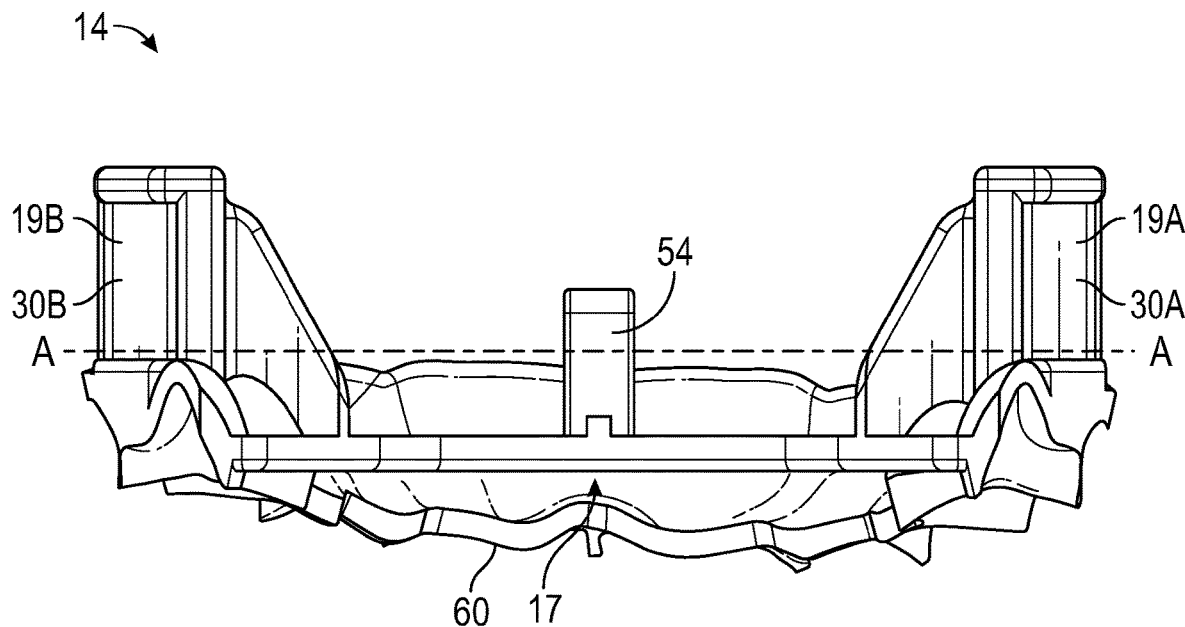
FIG. 5 is a back view of the lingual mold body of FIG. 4.
Figure 6:
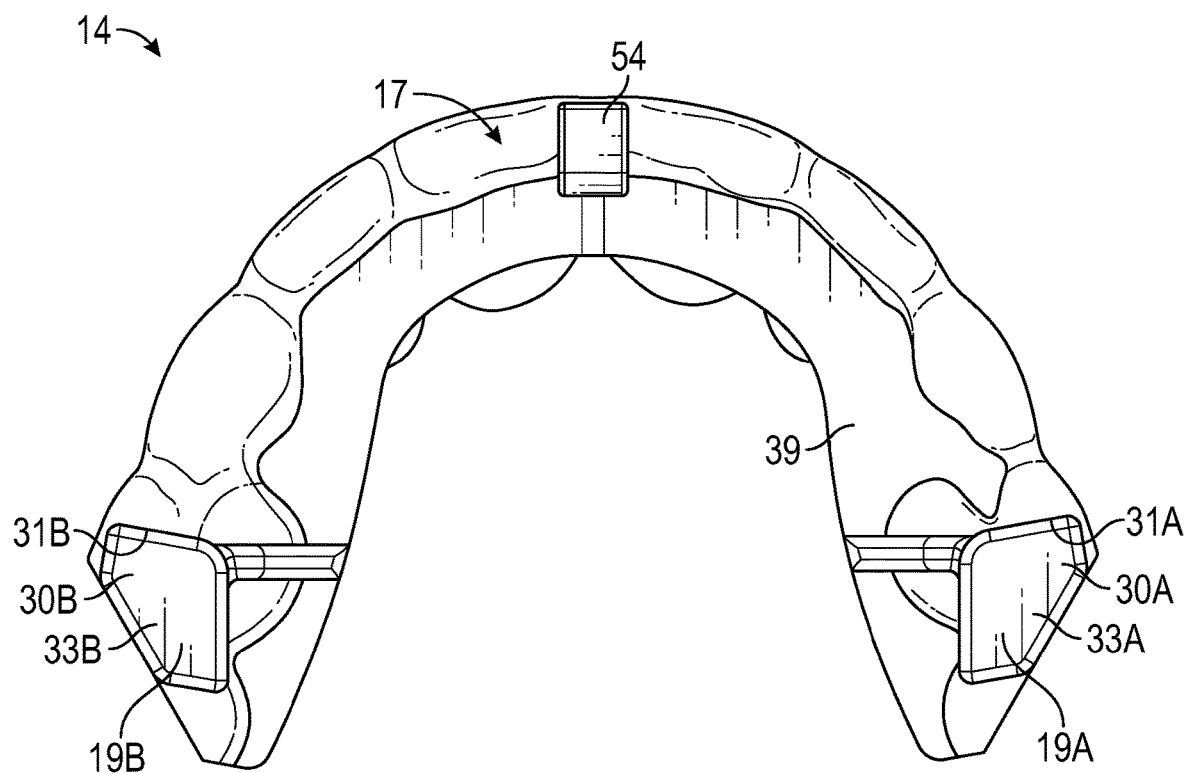
FIG. 6 is a bottom view of the lingual mold body of FIG. 4.

FIGS. 1, 2, and 3 illustrate an embodiment of a facial portion of the custom tool 10 of the present invention. FIGS. 4, 5, and 6 illustrate an embodiment of a lingual portion of the custom tool 10 of the present invention. "Facial" as used herein, including the claims, refers to the direction directed toward the cheeks or lips (i.e., the buccal and labial) of the patient, and opposite the lingual direction. "Lingual" as used herein, including the claims, refers to the direction directed toward the tongue of the patient, and opposite the facial direction. FIGS. 7, 8A, 8B, and 9 illustrate how the facial and lingual portions fit together to form a complete a custom tool 10 for forming a patient-specific dental restoration.

FIGS. 1-3 are views of the facial mold body 12 custom tool 10 for forming a patient-specific dental restoration. The tool 10 includes a facial mold body 12, which may be configured to provide a customized fit with at least one tooth of a patient. For example, facial mold body 12 may be specifically designed to fit next to, mate with, and provide restorative structure to the at least one tooth. In the example shown in FIG. 1, the facial mold body 12 includes a restorative portion 16 and an engagement portion. A practitioner uses the restorative portion 16 of the custom tool to restore at least one tooth in the mouth of the patient. In the illustrated embodiment, there are two engagement portions 18a, 18b (collectively, engagement portion 18) positioned at opposite ends of the restorative portion 16, which is located between the engagement portions 18a, 18b. This is ideal, but not necessary. For example, the facial mold body 12 could include just one engagement portion positioned adjacent the restorative portion 16. In tools having two engagement portions 18a, 18b, this provides two points of interlock between the lingual and facial mold bodies 12, 14. For descriptive ease and not otherwise depicted in the Figures, both the single and dual engagement portion embodiments may be referred to hereafter as engagement portion 18.

The first engagement portion 18a and second engagement portion 18B both extend away from the restorative portion. In the illustrated embodiment, the engagement portions 18 extend at a generally right angle relative to the restorative portion 16. When compared to the patient's mouth, which includes an occlusal plane shown generally by line A-A (in FIG. 2) the engagement portions 18 extend generally perpendicular to such occlusal plane.

The length of the engagement portions 18 extend some distance from the restorative portion 16 of the facial mold body 12. The length of the engagement portions may be customized and optimized for the individual patient. If the engagement portions are too long, they will stretch the patient's jaw, making it uncomfortable or painful for the patient. If the engagement portions are too short, the facial mold body 12 will disengage from the patient's teeth. In one embodiment, the length of the engagement portions may be 1 mm to 5 cm in length. However, it may depend on where exactly the engagement portions are located in the patient's mouth. They may be longer, if they are attach to the patient's teeth near the front of the mouth, such as the incisors. They may be shorter, if they are attached to the back of the mouth, like the molars. Also, the patient's overall opening distance between the upper and lower arches of teeth is a consideration.

As illustrated in FIG. 3, engagement portions 18 of the facial mold body 12 may include a variety of engagement surfaces configured to mate appropriately with the engagement surfaces on a lingual mold body 14. Engagement portions 18A, 18B of the facial mold body 12 may include a protrusion 20A, 20B respectively or some other mechanism known in the art for interlocking with the lingual mold body 14. In the illustrated embodiment, protrusion 20 includes a first engagement surface 24, a second engagement surface 26, and a third engagement surface 28. Protrusions 20A, 20B are sized and shaped to interlock or snap fit with the indentations 30A, 30B in the lingual mold body 14. Alternatively, the facial mold body 12 may include the indentations 30 and the lingual mold body 14 may include the protrusions 20. Alternatively, engagement portions 18 of the facial mold body 12 could include a protrusion on one end and an indentation on the opposite end, and the lingual mold body 14 could include an indentation on one end and a protrusion on the opposite end, to allow the two bodies 12, 14 to interlock together. Various structures known in the art may be substituted for the protrusion 20 and indentations 30, so long as they assist in securely interlocking the facial mold body 12 to the lingual mold body 14. For example, dovetail vertical slides or button and snaps may also be used as interlocking features of the engagement portions.

Figure 7:
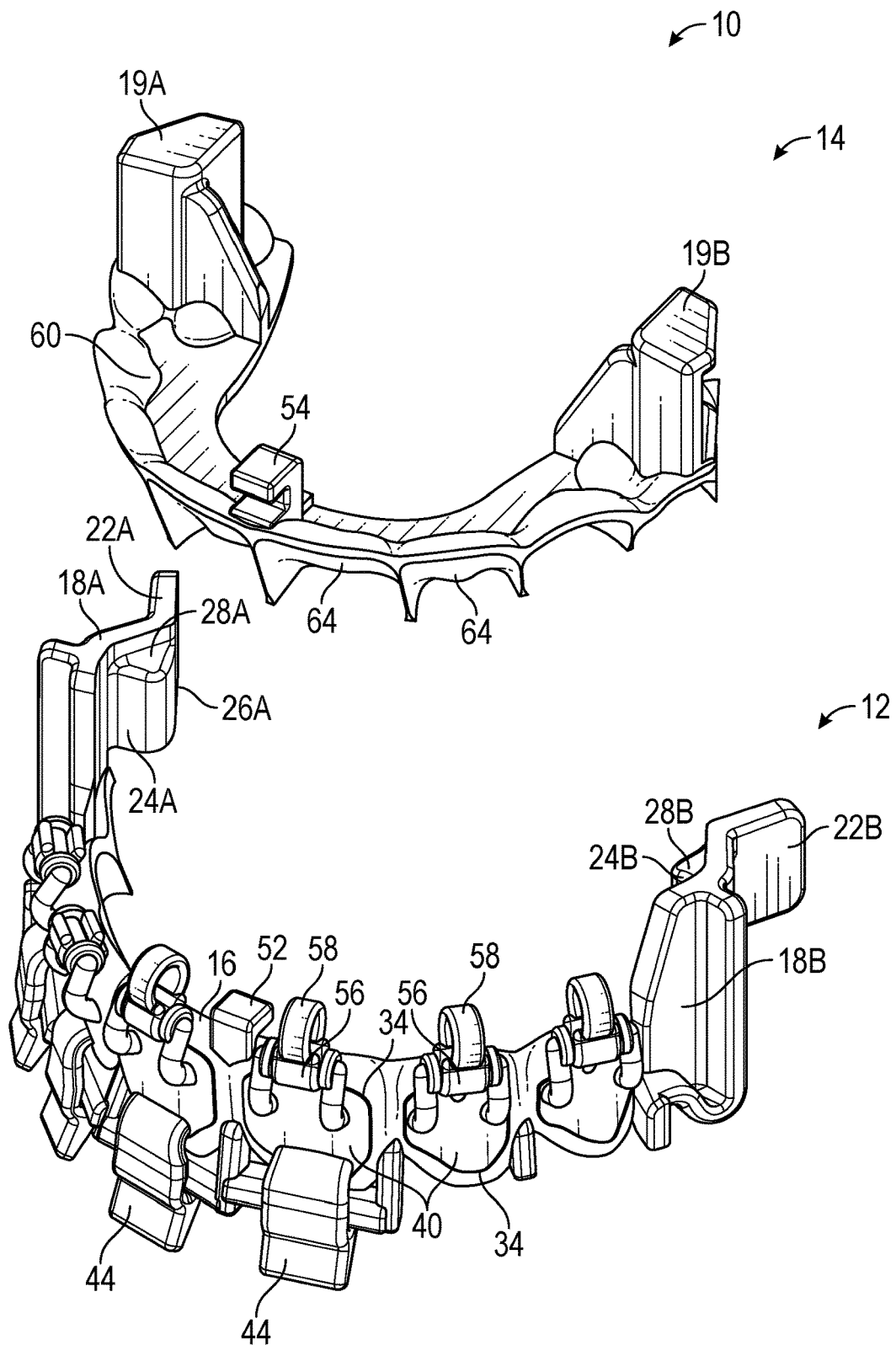
FIG. 7 is a perspective view of the facial mold body of FIG. 1 and the lingual mold body of FIG. 4 prior to interlocking them together.

The engagement portions 18A, 18B of the facial mold body 12 are structured to engage with or interlock with the engagement portions 31, 32, and 33 on the lingual mold body 14, as explained in more detail below in reference to FIGS. 7, 8, and 9.

In the illustrated embodiment, the restorative mold body 16 is sized and shaped to mate with the anterior teeth of a patient. The engagement portions 18 are sized and shaped be adjacent to the posterior teeth. However, in other embodiments (not illustrated), an engagement portion 18 could be adjacent the anterior teeth and the restorative portions 16 could be adjacent the posterior teeth.

In the example shown in FIG. 1, the facial body 12 includes one or more apertures 34, which may each be configured to align with a portion of a facial surface of a respective tooth of the patient to be restored. In some examples, the portion is a majority of the facial surface of the tooth to be restored. For example, aperture 34 may be configured to align with a portion comprising a majority of a facial surface of one tooth and aperture 34 may be configured to align with a portion comprising a majority of a facial surface of another tooth. The surface of the tooth to be restored and aligned with the respective apertures 34 may, for example, be defined by existing tooth structure or by the dental restoration formed using the facial mold body 12 and lingual mold body 14.

Each of the apertures 34 has a suitable configuration (e.g., shape and/or size) for introducing restorative material into a mold cavity defined by an interior surface 42 of door 40 and the interior mold surface 64 (shown in FIG. 4) to cover the portion of the surface of the tooth to be restored, where both interior surfaces 42, 64 are surfaces facing the tooth or teeth to be restored. When door 40 is mated with a respective aperture 34, the surface 42 of the door 40 and the tooth structure of a patient may help shape the restorative material that is placed in the mold cavity, e.g., in order to define the surface of the tooth to be restored.

In some embodiments, the shape of one or more of apertures 34 may be designed to substantially match the shape of the tooth and/or the portion of the tooth to be restored. For example, apertures 34 may be substantially noncircular. In other examples, however, the shape of one or more apertures 34 may be circular.

Apertures 34 may be sized to be larger than a tip of a dental capsule or a syringe tip that is used to introduce restorative dental material into the mold cavity defined by mold bodies 12, 14. Apertures 34 may be sufficiently large to allow placement and flow of restorative material to cover the portion of the surface of the tooth being restored. Additionally, or alternatively, apertures 34 may be sufficiently large to allow movement of the tip of the capsule or syringe tip within aperture 34. As another alternative, the custom tool 10 could include injection ports, as discussed in more detail below relative to FIG. 13.

The facial mold body 12 may have individual doors 40 sized to closely fit with corresponding apertures 34. Some of the doors 40 may be attached to the facial mold body 12 as illustrated with a hinge 48 and hinge pin 46 at one end, and an attachment mechanism 44 at the other end. The attachment mechanism 44 in this case is a clip 44 which is designed to clip over or snap onto an engagement surface 43 on the facial mold body 12. As such, the hinge 48 and hinge pin 46 are adjacent the occlusal surfaces of the patient's teeth or located proximate an incisal edge of a tooth or teeth to be restored and the clip 44 and engagement surface 43 are adjacent the gingiva of the patient's teeth. This arrangement is convenient for the clip to snap under the occlusal surfaces or incisal edge of the patient's teeth, spaced away from their tongue. However, in other embodiments not illustrated, their relative positions may be reversed, with the clip 44 and engagement surface 43 adjacent the incisal or occlusal surfaces of the patient's teeth and hinge 48 and hinge pin 46 adjacent the gingiva.

Figure 11A:
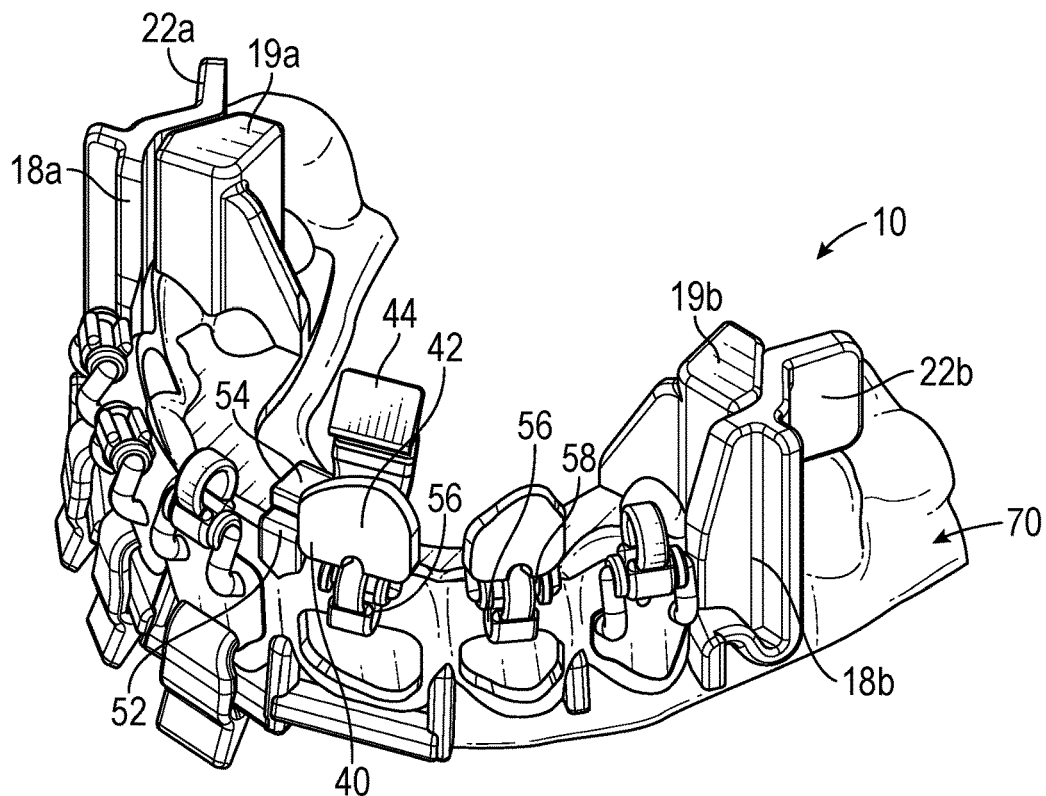
FIGS. 11A-11D illustrate example steps for using the tool of FIG. 9 to form a dental restoration in the mouth of the dental patient.
Figure 11B:
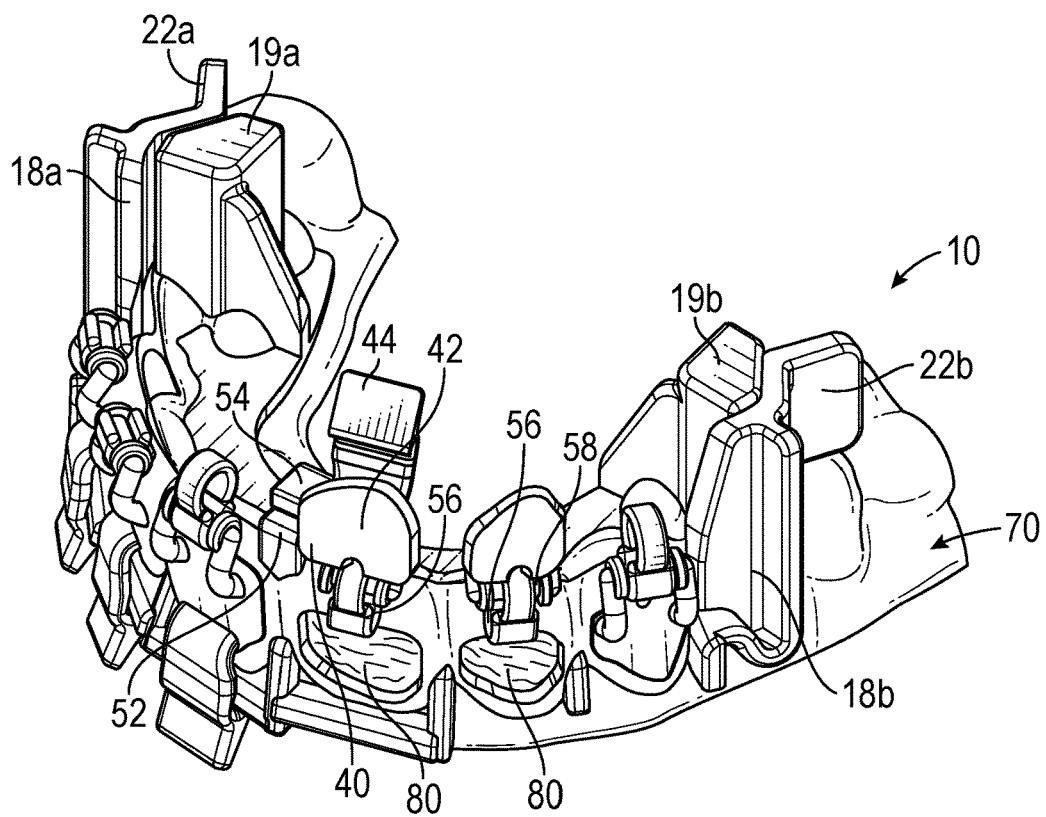

Additionally, some of the doors 40 may be attached to the facial mold body 12 as illustrated using a two-part hinge, having a first portion 56 and a second portion 58, and hinge pin 46 at one end, and an attachment mechanism 44 at the opposite end. The attachment mechanism 44 in this case is a clip 44 which is designed to clip over or snap onto an engagement surface 43 on the facial mold body 12. The first portion of the hinge 56 has a smaller diameter than the second portion of the hinge 58. The two-part hinge is convenient for lifting away and pulling the door 40 away from the aperture 34, when the second portion 58 is used. The two-part hinge is convenient for tightly inserting the door 40 into the aperture 34. The hinge pin 46 may move between the smaller diameter first portion and the larger diameter second portion of the hinge 58, as illustrated in FIGS. 11a and 11b. Additionally, the two-part hinge allows for it to be 3D printed already as a completed assembly. Also, the larger diameter in the second portion 58 of the hinge allows for easier cleanup of excess resin during use and helps prevent the bonding of the pin 46 to the hinge.

In the illustrated embodiment, the door body 40 and facial mold body 12 are mechanically connected to each other by using a hinge 48 and hinge pin 46. This configuration helps maintain proper alignment between the door body 40 and corresponding aperture 34 during use of custom tool 10. However, door body 40 and facial mold body 12 may be connected via a snap hinge, a living hinge, a barrel hinge, a pin joint hinge, or any other suitable type of hinge. Door hinge 48 and hinge pin 46 may be formed separate from the door body 40 and/or facial mold body 12 or door hinge 48 and hinge pin 46 may be formed as an integral part of door body 40 and/or facial mold body 12.

The facial mold body 12 may include a first alignment member 52, which assists in properly aligning the facial and lingual mold bodies 12, 14 before interlocking them together. In the illustrated embodiment, the first alignment member 52 is a post that is sized to fit with the second alignment member 54 in the lingual mold body 14, shown as a slot in FIGS. 4-7.

The facial mold body 12 and lingual mold body 14 may be configured to combine with at least one tooth of the patient to define a mold cavity encompassing at least a portion of desired tooth structure of the tooth or teeth to be restored. For example, in the illustrated example, the facial mold body 12 and lingual mold body 14 may combine with teeth of the patient to define a mold cavity encompassing at least a portion of desired tooth structure for each of the teeth with facial portions aligning with apertures 34A and 34B. In some examples, the dental restoration may include a dental veneer restoration on the tooth or teeth to be restored, and the apertures 34A and 34B may allow a practitioner to have better control over the placement of restorative material in the mold cavity than a traditional mold. For example, the apertures 34, which align with a majority of a surface of a lingual or facial surface of a tooth may allow a practitioner to have better control over the final appearance of that surface, including the final surface texture, shading, and layering of the restorative materials.

Tdoor body 40 may include a vent The vent may be configured to allow excess restorative material to flow out of a mold cavity, which may be removed prior to curing (e.g., with a scalar instrument), providing for easier removal of flash. Alternatively, or in addition, vent may be configured to allow air to flow out of the mold cavity.

The facial mold body 12 may include a custom gingival surface 36 that is generally contoured to match the gingiva, but not engaging the gingiva. This allows excess restoration material to be cleanly removed. The facial mold body 12 may also include a facial rib 38 to provide overall strength to the facial mold body.

Custom tool 10 may include a lingual mold body 14, which may also be configured to provide a customized fit with the at least one tooth of the patient. FIGS. 4, 5, and 6 illustrate views of one embodiment of the lingual mold body 14. Facial mold body 12 and lingual mold body 14 may be configured to combine with the at least one tooth of the patient to form the mold cavity. For example, facial mold body 12 and lingual mold body 14 may be configured to mate with one another and/or to be attached to the at least one tooth to form the mold cavity. In some examples, lingual mold body 14 is separable from and engageable with the facial mold body 12, while maintaining the integrity of the respective mold bodies, through use of their engagement portions 18, 19.

In the example shown in FIGS. 4-6, the lingual mold body 14 includes a restorative portion 17 and an engagement portion 19. A practitioner uses the restorative portion 17 of the custom tool to restore at least one tooth in the mouth of the patient. In the illustrated embodiment, there are two engagement portions 19A, 19B positioned at opposite ends of the restorative portion 17, which is located between the engagement portions 19A, 19B. This is ideal, but not necessary. For example, the lingual mold body 14 could include just one engagement portion 19 positioned adjacent the restorative portion 17. In tools having two engagement portions 19A, 19B, this provides two points of interlock between the lingual and facial and lingual mold bodies 12, 14 respectively.

Lingual mold body 14 includes first engagement portion 19A and second engagement portions 19B. The engagement portions 19A, 19B of the lingual mold body 14 are structured to engage with or interlock with the engagement portions 18A, 18B on the facial mold body 12, as explained in more detail below in reference to FIGS. 7, 8, and 9.

The first engagement portion 19A and second engagement portion 19B both extend away from the restorative portion. In the illustrated embodiment, the engagement portions 19 extend at a generally right angle relative to the restorative portion 17. When compared to the patient's mouth, which includes an occlusal plane illustrated as reference line A-A (shown in FIG. 6), the engagement portions 19 extend generally perpendicular to the occlusal plane.

As illustrated in FIG. 6, engagement portions 19 of the lingual mold body 14 may include a variety of engagement surfaces configured to mate appropriately with the engagement surfaces 24, 26, 28 on the facial mold body 12. Engagement portions 19A, 19B of the lingual mold body 14 may include an indentation 30A, 30B respectively or some other mechanism known in the art for interlocking with the facial mold body 12. In the illustrated embodiment, indentation 30 includes a first engagement surface 31, a second engagement surface 32, and a third engagement surface 33. Indentations 30A, 30B are sized and shaped to interlock or snap fit with the protrusions 20A, 20B in the facial mold body 12. Various structures known in the art may be substituted for the indentations 30 and protrusion 20, so long as they assist in securely interlocking the lingual mold body 14 to the facial mold body 12.

In the illustrated embodiment, the restorative portion 17 is sized and shaped to mate with the anterior teeth of a patient. The engagement portions 19 are sized and shaped to be adjacent the posterior teeth. However, in other embodiments (not illustrated), an engagement portion 19 could be adjacent the anterior teeth and the restorative portion 17 mate with the posterior teeth.

The facial mold body 12 includes a plurality of an engagement surfaces 43 adjacent the occlusal surfaces of the patient's teeth or located proximate to an incisal edge of a tooth or teeth to be restored. This arrangement is convenient for the clip 44 (shown in FIGS. 1-3) to snap under the occlusal surfaces or incisal edge of the patient's teeth, spaced away from their tongue. However, in other embodiments not illustrated, the engagement surface 43 may instead be adjacent the gingiva of the patient's teeth, with the clip 44 likewise being in a similar position.

The lingual body 14 includes mold surfaces 64 sized to create appropriate mold cavity or cavities with the inner surface 42 of the door 40 (shown in FIGS. 1-3) and/or in combination with the tooth structure of a patient to help shape the restorative material that is placed in the mold cavity or cavities in order to define the surface of the tooth or teeth to be restored.

The lingual mold body 14 may include a custom lingual rib 39 to provide additional clamping or mating to the individual patient's mouth, which helps provide additional stiffness and/or rigidity for the lingual mold body 14.

The lingual mold body 14 may include a second alignment member 54 sized and shaped to fit with the first alignment member 52. In the illustrated embodiment, the second alignment member 54 may be mesial alignment receptor. Specifically, the second alignment member may be a slot sized to receive the post 52 on the facial mold body 12.

FIGS. 8A, 8B, 9 and 10 are useful for illustrating how the facial mold body 12 and lingual mold body 14 are assembled together and around the teeth of a patient to form a custom tool 10. One of the major benefits of this design is that once assembled, movement between the facial mold body and the lingual mold body is restricted in multiple directions and multiple rotations. As a result, practitioners are able to create more accurate restorations for their patients.

Figure 8A:
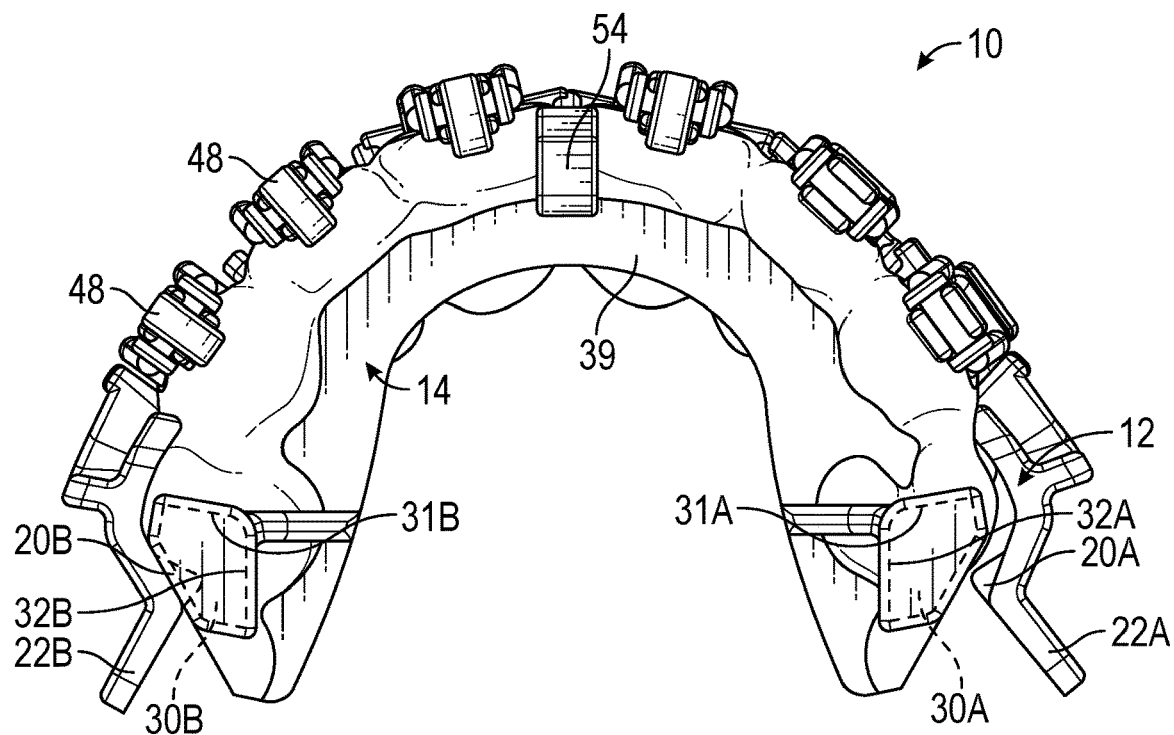
FIGS. 8A and 8B are bottom views convenient for showing how the facial mold body of FIG. 1 and the lingual mold body of FIG. 4 may interlock together to form an embodiment of custom tool for forming a dental restoration.
Figure 8B:
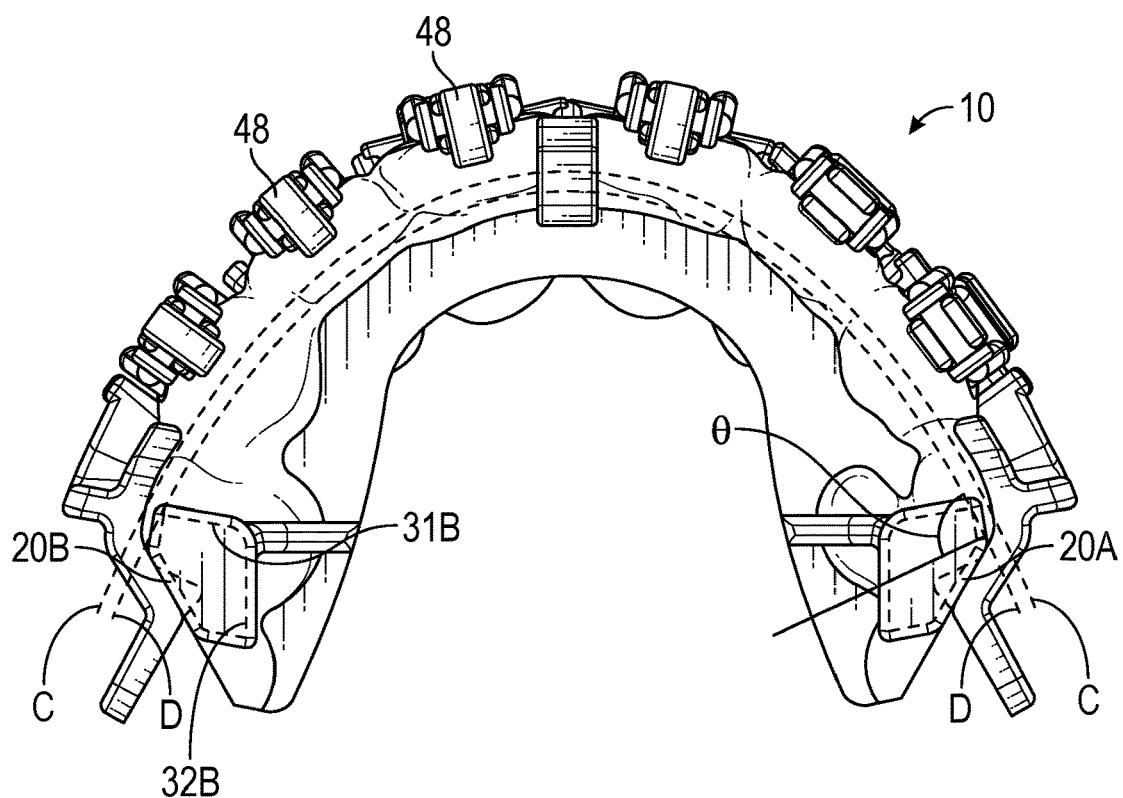
Figure 9:
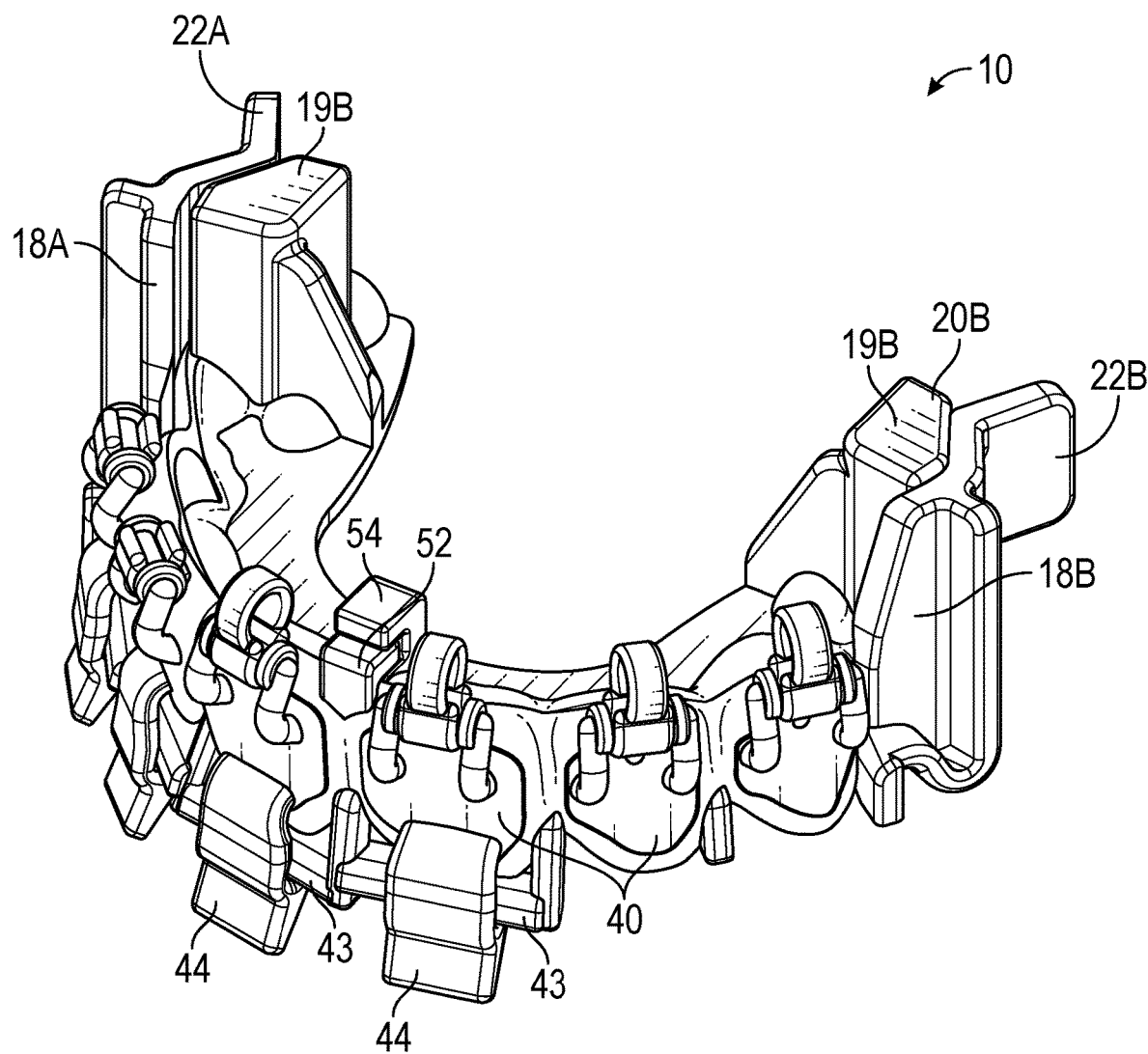
FIG. 9 is a perspective view of the custom tool of FIG. 8B.

With FIGS. 8A and 8B as a point of reference, a practitioner may first place the lingual mold body 14 behind the patient's teeth, with the second alignment member 54 centered adjacent the occlusal surfaces of the patient's teeth. Then, the practitioner may place the facial mold body 12 over the front of the teeth and align the first alignment member 52, the post, to fit into the second alignment member 54, the hole. However, in other embodiments, mold bodies 12, 14 could include indicia or alignment features (e.g., visual indicators, other forms of mechanical mating features, keyholes, notches, inking, and the like) to help a practitioner properly align and easily engage facial mold body 12 and lingual mold body 14 with one another.

The facial and lingual mold bodies 12, 14 are preferably made of flexible materials to bend them at certain radiuses to successfully interlock them together, as illustrated in FIGS. 8A and 8B. A practitioner will interlock the mold bodies 12, 14 together by placing the protrusions 20A, 20B into the corresponding indentations 30A, 30B. The release tabs 22A, 22B may optionally be used to help fit protrusions 20A, 20B into the indentations 30A, 30B. Custom tools can be made from the full range of 3D printed materials, molded polymeric material or CAD/CAM shaped polymeric materials having certain desired strength, flexibility, translucency, or color. For example, the mold material can be polymeric material that may be transparent, translucent, or opaque. In some embodiments, clear or substantially transparent polymeric material that may include, for example, one or more of amorphous thermoplastic polymers, semi-crystalline thermoplastic polymers, transparent thermoplastic polymers, and thermoset polymers. Thermoplastics can be chosen from polycarbonate, thermoplastic polyurethane, acrylic, polysulfone, polyprolylene, polypropylene/ethylene copolymer, cyclic olefin polymer/copolymer, poly-4-methyl-1-pentene or polyester/polycarbonate copolymer, styrenic polymeric materials, polyamide, polymethylpentene, polyetheretherketone and combinations thereof. In another embodiment, the mold may be chosen from clear or substantially transparent semi-crystalline thermoplastic, crystalline thermoplastics and composites, such as polyamide, polyethylene terephthalate. polybutylene terephthalate, polyester/polycarbonate copolymer, polyolefin, cyclic olefin styrenic polymer, copolymer, polyetherimide, polyetheretherketone, polyethersulfone, polytrimethylene terephthalate, and mixtures and combinations thereof. In some embodiments, the mold is a polymeric material chosen from polyethylene terephthalate, polyethylene terephthalate glycol, poly cyclohexylenedimethylene terephthalate glycol, and mixtures and combinations thereof. In additional embodiments thermoset polymers include acrylics, urethanes, esters, silicones, thiolenes, epoxies, olefin metathesis and combinations thereof.

The custom tool 10 is designed to ensure a relatively tight fit between the mold bodies 12, 14 to assure an accurate and precisely shaped restoration while helping reduce or eliminate the flash that occurs along the edge where the two mate together. Any flash that does occur may be very thin along the incisal edge and may be relatively easily removed with a dental instrument. By providing a relatively tight fit along the incisal edge or another edge of mold bodies 12,14, this may help excess restorative material preferentially flow toward the vent where flash may be relatively easily seen and removed during finishing of the restoration.

FIG. 8B is convenient for describing the clamping force that can be generated between the facial mold body 12 and the lingual mold body 14. The facial mold body 12 has a certain arch length (C), and the lingual mold body 14 has a certain arch length (D). When the custom tool 10 is made, the geometry of the facial and/or lingual mold bodies 12, 14 is altered. For instance, the arch length C of the facial mold body 12 may be shortened, while the arch length D of the lingual mold body is maintained, and this configuration creates a clamping force between the two mold bodes 12, 14 when they are assembled. In addition, the mold bodies 12, 14 are sufficiently strong so as not to break or buckle, and the protrusion 20 and the indentation 30 can be interlocked without creating undue pressure in the mouth of the patient. Clamping forces can also be generated by slightly reducing the radius of curvature of the facial mold body 12, while maintaining the radius of curvature of the lingual mold body 14. Angle θ illustrates the latching surface relative to the arch tangent.

The degree of clamping force between the facial mold body 12 and the lingual mold body 14 should be tailored to balance the security of the installed tool 10 around the patient's teeth and sealing it against the gingival tissues with ease of installation into and removal from the patient's mouth. The degree of clamping force can be increased by increasing the stiffness of the mold bodies 12, 14 via materials, geometry the amount of shortening of the facial mold body 12, and/or reduction of the radius of curvature of the facial mold body 12. Modifications to the mold bodies 12, 14 can be applied across the mold bodies, for instance by applying an appropriate shrinkage factor, or they can be applied locally to various regions of the mold bodies and/or latching mechanism between the two. Latch securement and ease of engagement and removal can be tailored by adjusting the latching angle, length of the latching surfaces (engagement surface) 31 32, 33 and topography of the surfaces 24, 26, 28 to obtain the best balance of performance. Tools such as finite element modeling can be used to predict the appropriate parameters for a given custom tool based on test results of previously tested cases. Machine learning can be applied to improve prediction capability over time, including feedback on clinical performance from practitioners. Digital design and manufacturing, such as 3D printing or CNC machining, is particularly helpful in creating custom tool molds with active clamping forces.

Figure 10:
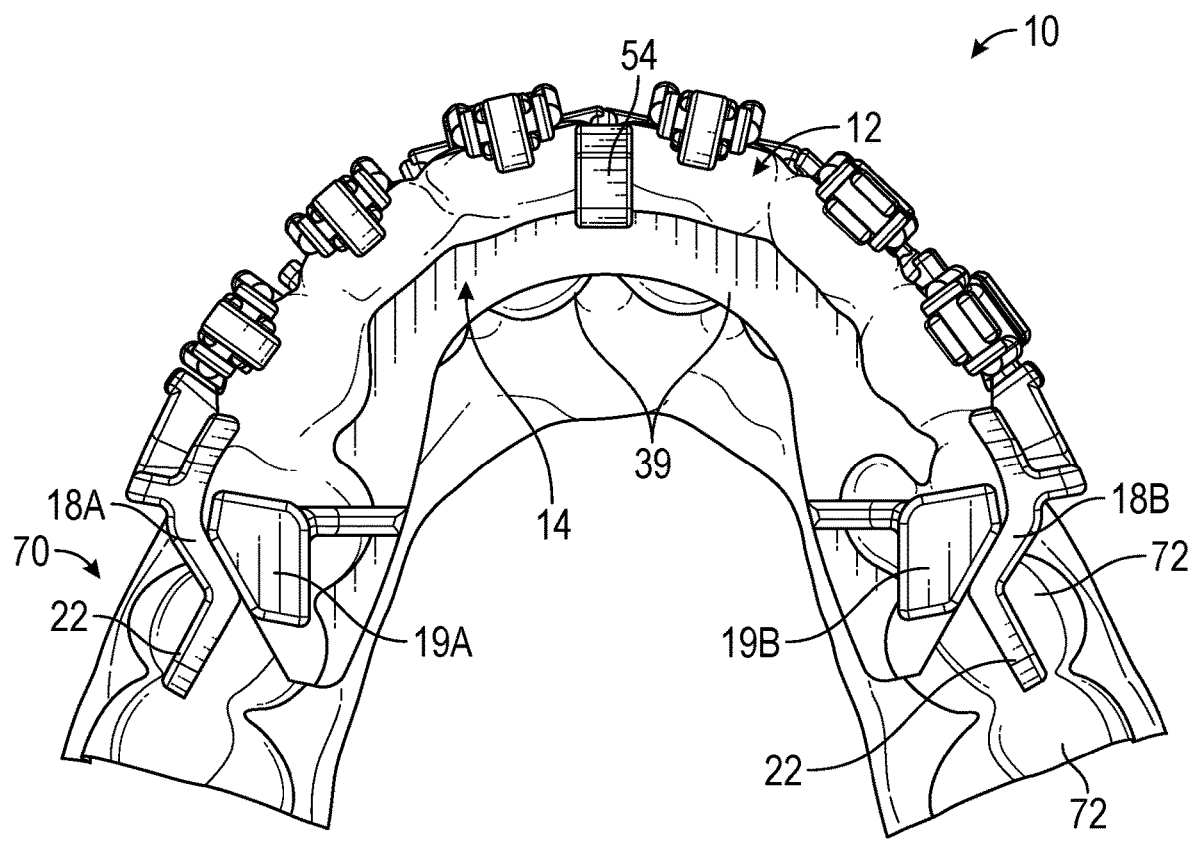
FIG. 10 is a bottom view of the custom tool of FIG. 9 in the mouth of a dental patient.

FIG. 10 illustrates the custom dental restorative tool 10 clamped appropriately around the patient's teeth 72 in the mouth 70 of the patient. The first engagement portions 18A, 19A of the facial and lingual mold bodies 12, 14 are interlocked together within the mouth, offset from the occlusal surfaces of the premolars and extending the direction of the patient's tongue (not shown). Similarly, the second engagement portions 18b, 19b of the facial and lingual mold bodies 12, 14 are interlocked. In the illustrated embodiment, the patient is having five teeth restored.

Figure 11C:
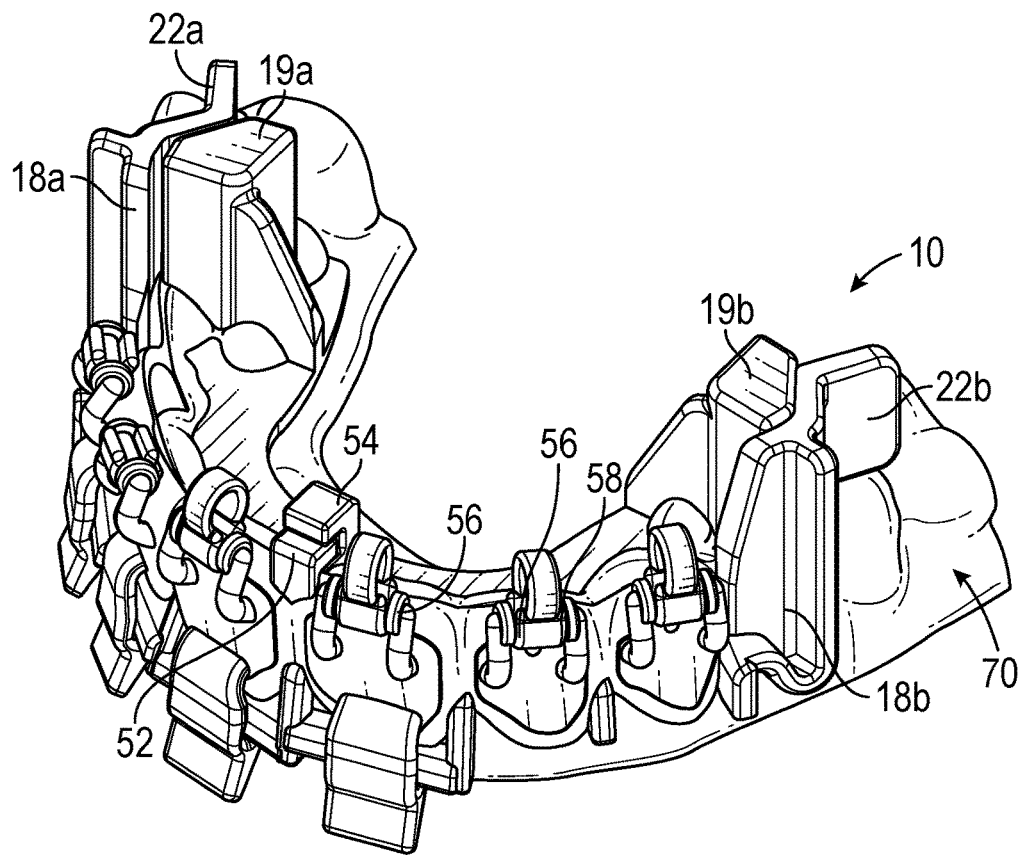
Figure 11D:
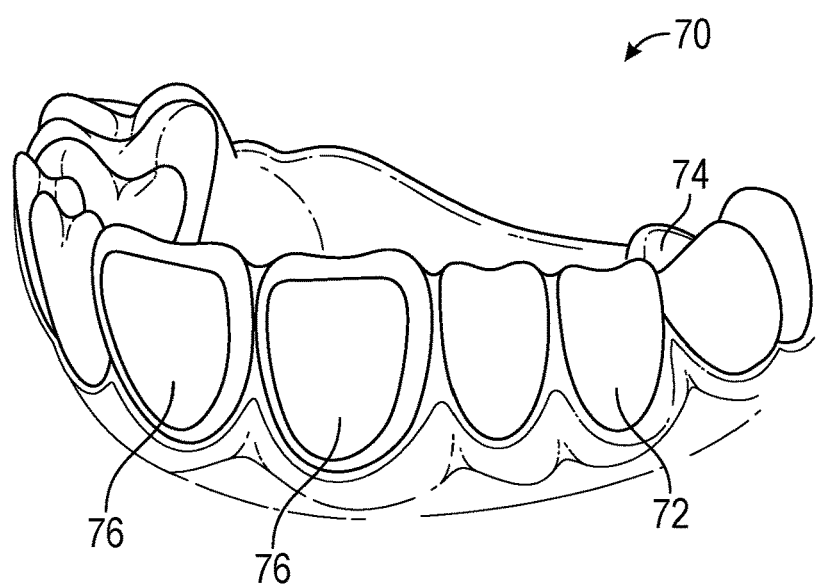

FIGS. 11A-11D are convenient for illustrating the method steps for using the custom tool 10 of the present invention after the custom tool is properly applied in the patient's mouth 70. FIG. 11A illustrates some of the doors 40 opened to allow access to the teeth to be restored. FIG. 11B illustrates restorative material 80 applied to the teeth to be restored. FIG. 11C illustrates curing of the restorative material 80 within the custom tool 10. FIG. 11D illustrates the teeth 72 of the patient's mouth 70 restored.

In some examples, apertures 34 of tool 10 may allow the practitioner to apply the restorative material 80 directly to the tooth to be restored. However, in other examples, the practitioner may apply the restorative material 80 to the tooth to be restored or to mold body 12, 14 before applying mold bodies 12, 14 over the teeth 72 of the patient.

The practitioner may fill the mold cavity defined by mold bodies 12, 14 and the teeth around which the mold bodies 12, 14 are positioned with restorative material 80 by introducing the restorative material 80 through one or more of apertures 34 and into the mold cavity (FIG. 11B). In some examples, the practitioner may use various tools to place the restorative material into the mold cavity. In some examples, restorative material 80 may be placed in the mold cavity through multiple apertures 34. One preferable dental restorative material is Filtek IM Supreme Universal™, commercially available from 3M Company based in St. Paul, Minnesota. After at least some restorative material 80 is introduced into the mold cavity, the practitioner may then close the door bodies 40 within the corresponding apertures 34 (FIG. 11C). The inner surfaces 42 of door bodies 40 and the mold surfaces 64 may be used to shape one or more layers of restorative material 80 on the facial or lingual surface of the tooth 72, to compress restorative material 80 within the mold cavity, or any combination thereof.

In some examples, the practitioner may cure the restorative material 80, while the door bodies 40 are closed into the apertures 34 of the facial mold body 12. For example, if the restorative material is light curable, the practitioner may expose the restorative material to the curing light (e.g., a blue light) through one or both of the mold bodies 12, 14, which may be formed of a material transparent to the curing light. The practitioner may remove the facial mold body 12 and the lingual mold body 14 from the teeth 72, which now have restored structure 76 defined by the restorative material (FIG. 11D). Removing the mold bodies 12, 14 from the mouth 70 may include separating the facial mold body 12 from the lingual mold body 14, which may include, for example, disengaging one or more of the first engagement portions 18A, 19A of the mold bodies 12, 14 from the second engagement portions 19A, 19B of the mold bodies 12, 14. In some example, the one or more of the door bodies 40 may leave "witness marks" on the lingual or facial surface of the tooth, but such marks may be relatively easily removable because they are relatively thin. In some examples, the practitioner may finish the teeth, which now include restored dental structure defined by the restorative material, such as by polishing, to remove flash or other undesired surface imperfections.

In some examples, the practitioner may place a release film on at least a portion of a surface 42 of the door 40 before placing the door 40 within its respective aperture 34. The release film may reduce the likelihood of trapping air within the mold cavity during stamping of the restorative material 80 with the door and/or may facilitate release of restorative material 80 from the surface 42 of the door 40.

In addition to, or instead of, the release film, in some examples, the device manufacturer practitioner may apply a coating on at least a portion of a surface 42 of the door 40 and/or the door body before placing the door 40 within the respective aperture 34. The coating may reduce the likelihood of trapping air within the mold cavity during stamping of the restorative material with the door and/or may facilitate release of restorative material from the surface of the door. Release coatings may also be applied to any of the mold components during the manufacturing process.

The introduction of the restorative material 80 into mold cavity may have enough force to separate parts of mold bodies 12, 14 from each other, thereby providing less of an engagement between facial mold body 12 and lingual mold body 14 and/or less of a customized fit with one or more teeth. However, the engagement portions 18, 19 help mold bodies 12, 14 self-align with each other and stay firmly fixed relatively to each other.

FIGS. 12A-18C illustrate additional embodiments of the custom tool of the present disclosure.

Figure 12A:
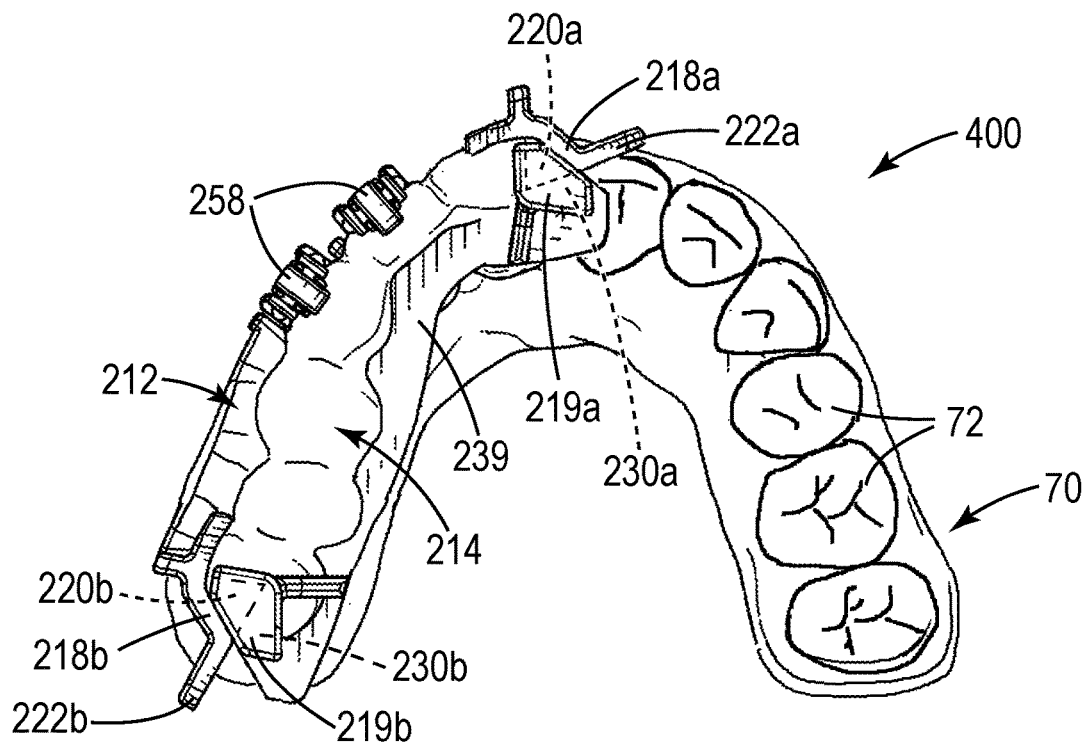
FIGS. 12A-12C are bottom views of more embodiments of a custom tool for forming a dental restoration, illustrating partial to full dental arch embodiments in a patient's mouth.
Figure 12B:
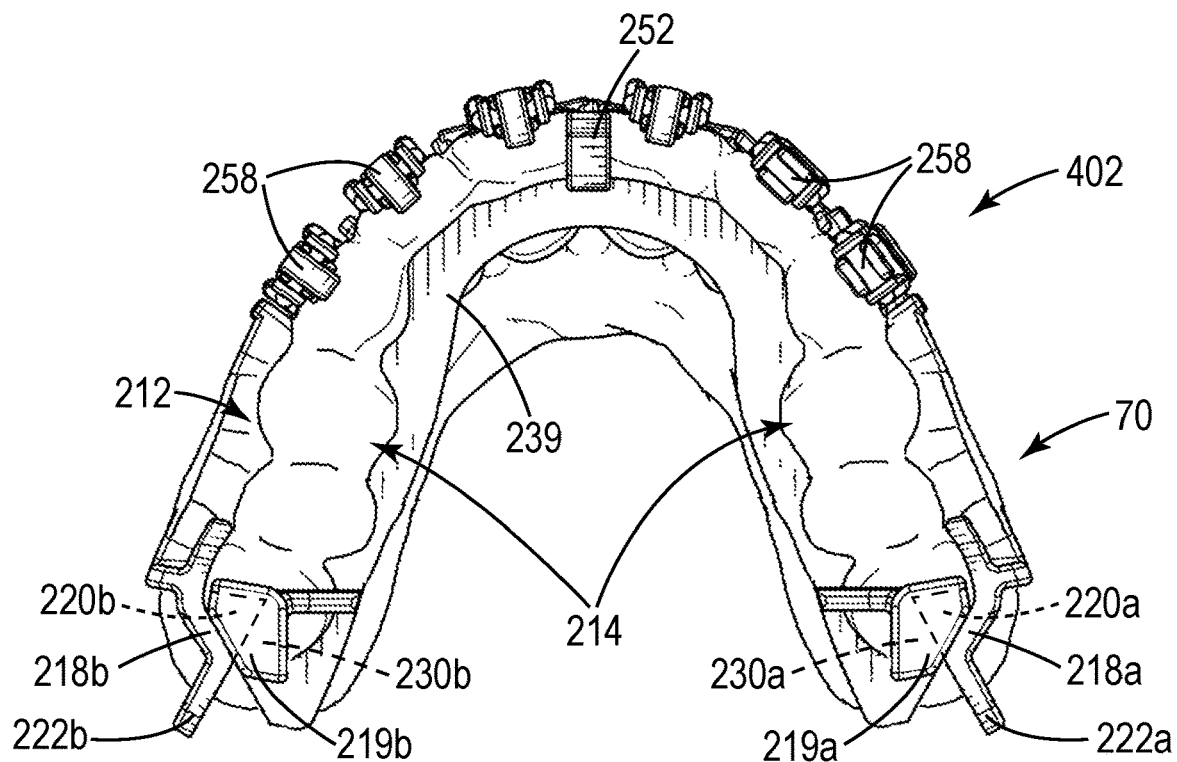
Figure 12C:
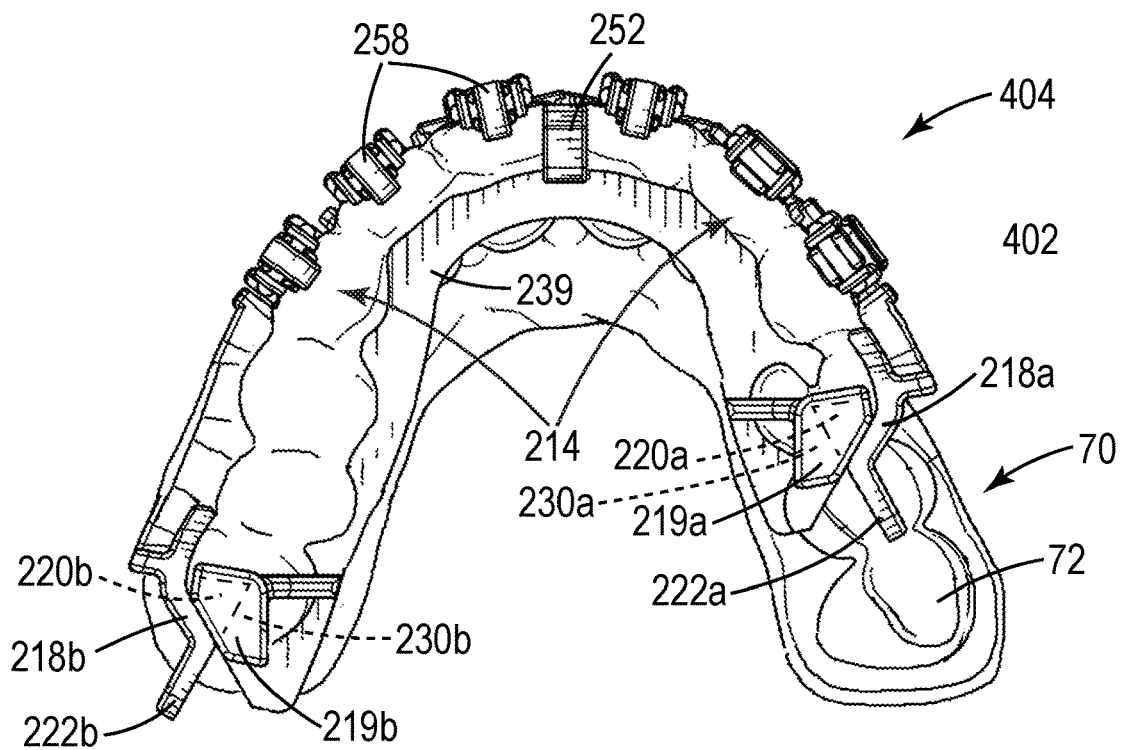

FIGS. 12A-12C illustrate additional embodiments of custom tools 400, 402, 404 of the present invention, where the hinges 144 pivot adjacent the patient's incisal surfaces of their teeth. The embodiments shown in FIGS. 12A-12C are very similar to the embodiments shown in the other Figures, except they are engaged with different portions of the patient's mouth.

FIG. 12A illustrates an embodiment of a custom tool 400, where the custom tool 400 engages with a portion of the arch of the patient's mouth 70, specifically the portion of the patient's arch extending between a molar tooth and an incisor tooth. The engagement portions 219 of the lingual mold body 214 are in combination with the engagement portions 218 of the facial mold body 112 to form a complete the custom tool 400 for forming a patient-specific dental restoration. Engagement portion 219a combines with protrusion 220a of engagement portion 218a to interlock adjacent one of the patient's incisor teeth. Engagement portion 219b combines with protrusion 220b of engagement portion 118b to interlock adjacent one of the patient's molar teeth. The release tabs 222a, 222b may optionally be used to help fit protrusions 220a, 220b into the indentations 230a, 230b. The lingual mold body 214 may include a custom lingual rib 239 to provide additional clamping or mating to the individual patient's mouth.

FIG. 12B illustrates an embodiment of a custom tool 402, where the custom tool 402 engages with the full arch of the patient's mouth 70, specifically the portion of the patient's arch extending between one molar tooth and another molar tooth. The engagement portions 219 of the lingual mold body 214 are in combination with the engagement portions 218 of the facial mold body 212 to form a complete the custom tool 402 for forming a patient-specific dental restoration. Engagement portion 219a combines with protrusion 220a of engagement portion 218a to interlock adjacent one of the patient's incisor teeth. Engagement portion 219b combines with protrusion 220b of engagement portion 218b to interlock adjacent one of the patient's molar teeth. The release tabs 222a, 222b may optionally be used to help fit protrusions 220a, 220b into the indentations 230a, 230b. The lingual mold body 214 may include a custom lingual rib 239 to provide additional clamping or mating to the individual patient's mouth.

FIG. 12C illustrates an embodiment of a custom tool 404, where the custom tool 404 engages with a portion of the arch of the patient's mouth 70, specifically the portion of the patient's arch extending between a molar tooth and a premolar tooth. The engagement portions 219 of the lingual mold body 214 are in combination with the engagement portions 218 of the facial mold body 212 to form a complete the custom tool 404 for forming a patient-specific dental restoration. Engagement portion 219a combines with protrusion 220a of engagement portion 218a to interlock adjacent one of the patient's incisor teeth. Engagement portion 219b combines with protrusion 220b of engagement portion 218b to interlock adjacent one of the patient's molar teeth. The release tabs 222a, 222b may optionally be used to help fit protrusions 220a, 220b into the indentations 230a, 230b. The lingual mold body 214 may include a custom lingual rib 239 to provide additional clamping or mating to the individual patient's mouth.

Figure 13:
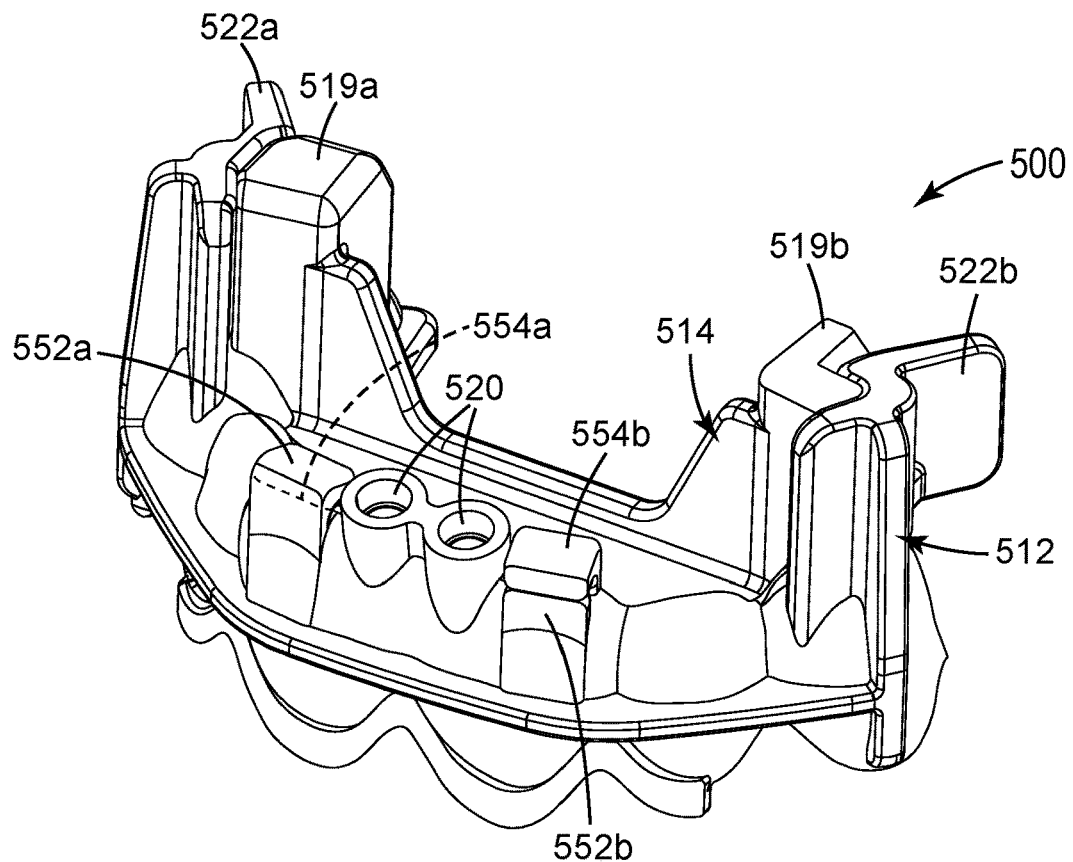
FIG. 13 is a perspective view of an embodiment of a custom tool for forming a dental restoration including injection ports.

FIG. 13 illustrates an embodiment of a custom tool 500 for forming a dental restoration, where the custom tool 500 includes injection ports 520 and two different embodiments of engagement portions 519a, and 519b. The custom tool 520 includes injection ports 520 for delivery of restorative dental material into the mold cavities formed between the facial mold body 512 and the lingual mold body 514. In this embodiment, the ports 520 are formed when the facial mold body 512 and lingual mold body 514 fit together to form a complete the custom tool 500 for forming a patient-specific dental restoration. Optionally, the custom tool 500 may include plugs (not shown) for positioning in the ports 520 following the injection of the restorative dental material into the mold cavities.

The facial mold body 512 may include first alignment members 552a, 552b and the lingual mold body 514 may include second alignment members 554a, 554b, all of which assist in properly aligning the facial and lingual mold bodies 512, 514 before interlocking them together. The first alignment member 552a interlocks with second alignment member 554a. The first alignment member 552b interlocks with second alignment member 554b. In this embodiment, the injection ports 520 are positioned between the alignment members 552a, 554a, 552b, 554 b respectively, however this is not necessary.

The lingual mold body 514 may include engagement portion 519a or 519b, as illustrated. However, other engagement portions may be used as discussed above.

The custom molds of the present invention are advantageous of those of the prior art. As one example U.S. Pat. No. 8,366,445 (Vuillemot) shows in FIGS. 4-5 alignment features to register the buccal and lingual mold portions. The alignment features are placed on the interfacial surface between the buccal and lingual molds. They may be toleranced to provide some frictional resistance to secure the assembled molds. This has the several disadvantages over the spaced part engaging portions that interlocks. For example, the retentive features as shown in Vuillemot complicate the seating and curing of the mold. To create space for the retentive features, the mold interface area must be expanding, resulting in a more bulky design. If frictional forces are used to secure the mold, then these same frictional forces must be overcome to seat the mold and it is difficult to know when the mold halves are completely seated. Molds that are not completely seated will lead to flash as the composite flows into the gap during use. The retentive features on the mating surface result in bonding of the composite to the mold during the curing process and make removal of the molds extremely difficult.

In contrast, the interlocking engaging portions of the present invention, are not placed along the interface, rather they are separately located away from the interfacial surface. This provides several advantages. The interface between the lingual and facial molds is not expanded or complicated by fine alignment features, rather it is smooth, easy to seat closed, and easy to verify that it is seated. There is a smooth interfacial surface to minimize retention forces of any flash cured at the interface. The present latching mechanism (interlocking engaging portion) is physically separated from the areas where flash may be expressed during filling. The present latching mechanism interlocking engaging portion) is separately activated from the seating and releasing of the facial and lingual molds by easy-to-grasp tabs. Lastly, the present latching mechanism (interlocking engaging portion) can be configured to provide a designed interference between facial and lingual molds such that a residual seating pressure exists when the engagement portions are interlocked, even when the facial and lingual molds are closed. This seating pressure helps to keep the custom tool remain securely shut even under the pressure of composite filling.

Custom tools as described herein may be formed based on a digital model of the teeth and mouth of an individual patient, which can be produced an intra-oral 3D scan, such as an intraoral scanner. In one particular example, the custom tools may be digitally designed using CAD software, such as solid modeling software based on the digital model of the planned restored dentition. Custom tool was designed to fit over the tooth or teeth to be restored teeth (the restorative portion) and a portion of the neighboring teeth (the engagement portions). Subsequently, the tooth structure model of the restored teeth may be digitally subtracted from a mold block to create a tool. Alternatively, an inverse of the tooth structure may be inverted within software to define the mold block. Engagement portions may be located in regions which correspond to regions of the teeth where they will extend from.

Within the digital model, the mold block design may be segmented into two sections (facial mold body and lingual mold body) to facilitate eventual assembly of the tool components on the teeth, with specific geometric interferences selected related to the arch lengths to provide desired the clamping forces, as discussed above. Within the digital model, engagement portions with certain interlocking geometries are designed, selecting overall heights of the engagement portions based where the engagement portions are placed within the patient's mouth, as discussed in more detail above.

The following embodiments are intended to be illustrative of the present disclosure and not limiting.

EXEMPLARY EMBODIMENTS

Embodiment 1 is a custom tool for forming a dental restoration in a mouth of a patient, the custom tool comprising: a facial mold body for a patient-specific, customized fit with the facial side of at least one tooth of the patient, wherein the facial mold body includes a restorative portion, at least one aperture aligned with a portion of a surface of a tooth to be restored and at least one door having an inner surface forming a portion of the mold cavity encompassing missing tooth structure of the tooth to be restored, wherein the door mates with the aperture; a lingual mold body for a patient-specific, customized fit with the lingual side of the tooth of the patient, wherein the lingual mold body includes a restorative portion; wherein the facial mold body and lingual mold body are configured to interlock together; and wherein the facial mold body and lingual mold body are configured to combine with the tooth of the patient to form a mold cavity encompassing missing tooth structure of at least one tooth to be restored.

Embodiment 2 is the custom tool of Embodiment 1, wherein the at least one door includes a hinge for attachment to the lingual mold body or the facial mold body.

Embodiment 3 is the custom tool of Embodiments 1-2, wherein the hinge includes a first portion with a first diameter and a second portion with a second diameter.

Embodiment 4 is the custom tool of Embodiment 3, wherein the at least one door includes an attachment mechanism for attachment to the facial mold body or the lingual mold body.

Embodiment 5 is the custom tool of Embodiment 4, wherein the attachment mechanism is a clip.

Embodiment 6 is the custom tool of Embodiments 1-5, further including a first mesial alignment member on the facial mold body and a second mesial alignment member on the lingual mold body.

Embodiment 7 is the custom tool of Embodiments 1-6, wherein the restorative portions of the facial mold body and lingual mold body mate with anterior teeth of the patient, and wherein the engagement portions are proximate to posterior teeth of the patient.

Embodiment 8 is the custom tool of Embodiments 1-7, wherein the restorative portions of the facial mold body and lingual mold body mate with posterior teeth of the patient, and wherein the engagement portions are proximate to anterior teeth of the patient.

Embodiment 9 is the custom tool of Embodiments 1-2, wherein the hinge for the door is adjacent a gingival portion of the facial mold body.

Embodiment 10 is the custom tool of Embodiments 1-2, wherein the hinge for the door is adjacent an occlusal portion of the facial mold body.

Embodiment 11 is the custom tool of Embodiments 1-2, wherein the hinge for the door is attached to the facial mold body is adjacent a mesial or distal side of the tooth to be restored.

Embodiment 12 is the custom tool of any of the proceeding Embodiments, wherein the facial mold body has a customized fit with the facial side of multiple teeth of the patient and the lingual mold body has a customized fit with the lingual side of multiple teeth of the patient.

Embodiment 13 is the custom tool of any of the proceeding Embodiments, wherein the facial mold body further includes a first engagement portion extending away from the restorative portion, wherein the lingual mold body further includes a first engagement portion extending away from the restorative portion, and wherein the first engagement portion of the facial mold body interlocks with the first engagement portion of the lingual mold body.

Embodiment 14 is the custom tool of Embodiment 13, wherein the mouth of the patient includes an occlusal plane, and wherein the first engagement portion of the facial mold body and the first engagement portion of the lingual mold body extend generally perpendicular to the occlusal plane.

Embodiment 15 is the custom tool of Embodiment 13, wherein the facial mold body includes a second engagement portion extending away from the restorative portion, and wherein the lingual mold body includes a second engagement portion extending away from the restorative portion; and wherein the second portion of the facial mold body interlocks with the second portion of the lingual mold body.

Embodiment 16 is the custom tool of Embodiment 15, wherein the first engagement portions are proximate the anterior teeth of the patient and the second engagement portions are proximate the posterior teeth of the patient, and the restoration portions of the facial mold body and lingual mold body mate with either the anterior or posterior teeth.

Embodiment 17 is custom tool of Embodiment 1, wherein the custom tool is configured to combine with a portion of the patient's dental arch extending between a molar tooth and an incisor tooth.

Embodiment 18 is custom tool of Embodiment 1, wherein the custom tool is configured to combine with a portion of the patient's dental arch extending between one molar tooth and another molar tooth.

Embodiment 19 is custom tool of Embodiment 1, wherein the custom tool is configured to combine with a portion of the patient's dental arch extending between a molar tooth and a premolar tooth.

Embodiment 20 is custom tool of Embodiment 1, further including a port, wherein a dental restoration material may be injected into the mold cavity through the port.

What is claimed is:

1. A custom tool for forming a dental restoration in a mouth of a patient, the custom tool comprising:
   a facial mold body for a patient-specific, customized fit with a facial side of at least one tooth of the patient, wherein the facial mold body includes a facial restorative portion, at least one aperture aligned with a portion of a surface of a tooth to be restored and at least one door having an inner surface forming a portion of a mold cavity encompassing missing tooth structure of the tooth to be restored, wherein the at least one door mates with the aperture;
   a lingual mold body for a patient-specific, customized fit with a lingual side of the tooth of the patient, wherein the lingual mold body includes a lingual restorative portion;
   wherein the facial mold body and lingual mold body are configured to interlock together; and
   wherein the facial mold body and lingual mold body are configured to combine with the tooth of the patient to form a mold cavity encompassing the missing tooth structure of the at least one tooth to be restored, wherein the at least one door includes a hinge for attachment to the lingual mold body or the facial mold body, wherein the hinge includes a first portion with a first diameter and a second portion with a second diameter larger than the first diameter, and wherein the door includes a hinge pin moveable between the first portion and the second portion,
   wherein the second portion is configured for lifting away and pulling the door away from the aperture, and wherein the first portion is configured for inserting the door into the aperture.

2. The custom tool of claim 1, wherein the at least one door includes a clip for attachment to the facial mold body or the lingual mold body.

3. The custom tool of claim 1, further including a first mesial alignment member on the facial mold body and a second mesial alignment member on the lingual mold body.

4. The custom tool of claim 1, wherein the restorative portions of the facial mold body and lingual mold body mate with anterior teeth of the patient, and wherein the engagement portions are proximate to posterior teeth of the patient.

5. The custom tool of claim 1, wherein the restorative portions of the facial mold body and lingual mold body mate with posterior teeth of the patient, and wherein the engagement portions are proximate to anterior teeth of the patient.

6. The custom tool of claim 1, wherein the hinge for the door is adjacent a gingival portion of the facial mold body.

7. The custom tool of claim 1, wherein the hinge for the door is adjacent an occlusal portion of the facial mold body.

8. The custom tool of claim 1, wherein the hinge for the door is attached to the facial mold body is adjacent a mesial or distal side of the tooth to be restored.

9. The custom tool of claim 1, wherein the facial mold body has a customized fit with the facial side of multiple teeth of the patient and the lingual mold body has a customized fit with the lingual side of multiple teeth of the patient.

10. The custom tool of claim 1, wherein the facial mold body further includes a first facial engagement portion extending away from the facial restorative portion, wherein the lingual mold body further includes a first lingual engagement portion extending away from the lingual restorative portion, and wherein the first facial engagement portion interlocks with the first lingual engagement portion.

11. The custom tool of claim 10, wherein the mouth of the patient includes an occlusal plane, and wherein the first facial engagement portion and the first lingual engagement portion extend generally perpendicular to the occlusal plane.

12. The custom tool of claim 10, wherein the facial mold body includes a second facial engagement portion extending away from the facial restorative portion, and wherein the lingual mold body includes a second lingual engagement portion extending away from the lingual restorative portion; and wherein the second facial engagement portion interlocks with the second lingual engagement portion.

13. The custom tool of claim 12, wherein the first facial and lingual engagement portions are proximate the anterior teeth of the patient and the second facial and lingual engagement portions are proximate the posterior teeth of the patient, and the restoration portions of the facial mold body and lingual mold body mate with either the anterior or posterior teeth.

14. The custom tool of claim 1, wherein the custom tool is configured to combine with a portion of the patient's dental arch extending between a molar tooth and an incisor tooth.

15. The custom tool of claim 1, wherein the custom tool is configured to combine with a portion of the patient's dental arch extending between one molar tooth and another molar tooth.

16. The custom tool of claim 1, wherein the custom tool is configured to combine with a portion of the patient's dental arch extending between a molar tooth and a premolar tooth.

17. The custom tool of claim 1, further including a port, wherein a dental restoration material may be injected into the mold cavity through the port.

* * * * *